(12) United States Patent
Damnjanovic et al.

(10) Patent No.: US 9,191,177 B2
(45) Date of Patent: Nov. 17, 2015

(54) TRANSMISSION OF FEEDBACK INFORMATION FOR MULTI-CARRIER OPERATION

(75) Inventors: Jelena M. Damnjanovic, Del Mar, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 12/772,934

(22) Filed: May 3, 2010

(65) Prior Publication Data

US 2011/0110246 A1 May 12, 2011

Related U.S. Application Data

(60) Provisional application No. 61/175,382, filed on May 4, 2009.

(51) Int. Cl.
*H04L 5/00* (2006.01)
*H04L 1/00* (2006.01)
(Continued)

(52) U.S. Cl.
CPC ............ *H04L 5/0094* (2013.01); *H04L 1/0028* (2013.01); *H04L 1/1861* (2013.01); *H04L 5/06* (2013.01); *H04L 1/18* (2013.01); *H04L 5/006* (2013.01); *H04L 5/0007* (2013.01)

(58) Field of Classification Search
USPC .................................. 370/252, 329; 455/450
See application file for complete search history.

(56) References Cited

U.S. PATENT DOCUMENTS 8,310,981 B2 11/2012 Damnjanovic et al.

8,477,734 B2 7/2013 Sambhwani et al.
(Continued)

FOREIGN PATENT DOCUMENTS

EP 1257069 A1 11/2002
RU 2233033 C2 7/2004
(Continued)

OTHER PUBLICATIONS

Ericsson: "Uplink transmission of ACK/NACK for E-UTRA TDD", 3GPP Draft; R1071894, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20070417, Apr. 17, 2007, XP050111798, [retrieved on Apr. 17, 2007].

(Continued)

*Primary Examiner* — Albert T Chou
(74) *Attorney, Agent, or Firm* — Paul Kuo

(57) ABSTRACT

Techniques for sending feedback information for multi-carrier operation are described. In an aspect, feedback information may be sent on an uplink carrier that may or may not be paired with a downlink carrier on which data transmission is sent. A user equipment (UE) may receive data transmission on a downlink carrier among a plurality of downlink carriers. The UE may determine feedback information for the data transmission, determine an uplink carrier to use to send the feedback information from among a plurality of uplink carriers, and send the feedback information on the uplink carrier. In another aspect, feedback information for multiple downlink carriers may be sent on at least one uplink carrier using Single-Carrier Frequency Division Multiple Access (SC-FDMA). A UE may receive data transmissions on a plurality of downlink carriers, determine feedback information for the data transmissions, and send the feedback information on at least one uplink carrier using SC-FDMA.

15 Claims, 11 Drawing Sheets

(51) Int. Cl.
*H04L 5/06* (2006.01)
*H04L 1/18* (2006.01)

(56) References Cited

U.S. PATENT DOCUMENTS

| | | | |
|---|---|---|---|
| 8,705,634 | B2 | 4/2014 | Wegener |
| 2004/0042427 | A1 | 3/2004 | Hottinen |
| 2006/0274712 | A1 | 12/2006 | Malladi et al. |
| 2010/0098012 | A1* | 4/2010 | Bala et al. ............ 370/329 |
| 2010/0195614 | A1 | 8/2010 | Nimbalker et al. |
| 2010/0232382 | A1* | 9/2010 | Gauvreau et al. ...... 370/329 |
| 2010/0234037 | A1* | 9/2010 | Terry et al. ........... 455/450 |
| 2010/0254329 | A1* | 10/2010 | Pan et al. ............ 370/329 |
| 2010/0271970 | A1* | 10/2010 | Pan et al. ............ 370/252 |
| 2010/0272048 | A1 | 10/2010 | Pan et al. |
| 2011/0116455 | A1 | 5/2011 | Damnjanovic et al. |
| 2011/0116457 | A1 | 5/2011 | Damnjanovic et al. |
| 2011/0274071 | A1* | 11/2011 | Lee et al. ............ 370/329 |
| 2012/0002631 | A1 | 1/2012 | Nishio et al. |
| 2012/0113913 | A1 | 5/2012 | Tiirola et al. |
| 2013/0329678 | A1 | 12/2013 | Pan et al. |
| 2014/0334429 | A1 | 11/2014 | Damnjanovic et al. |

FOREIGN PATENT DOCUMENTS

| | | |
|---|---|---|
| RU | 2339186 C1 | 11/2008 |
| WO | 0035117 A2 | 6/2000 |
| WO | 2006052501 A1 | 5/2006 |
| WO | 2006052502 A2 | 5/2006 |
| WO | WO2009034554 A2 | 3/2009 |
| WO | 2010106786 A1 | 9/2010 |

OTHER PUBLICATIONS

Huawei: "PUCCH design for carrier aggregation" 3GPP Draft; R1-091275, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009, XP050338883 [retrieved on Mar. 17, 2009].
International Search Report and Written Opinion—PCT/US2010/033635, International Search Authority—European Patent Office—Jan. 11, 2011.
International Search Report and Written Opinion—PCT/US2010/033633—International Search Authority, European Patent Office,Jan. 25, 2011.
Ipwireless: "UL ACK/NACK signalling for E-UTRA TDD", 3GPP Draft; R1-071888, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 17, 2007, XP050111792, [retrieved on Apr. 17, 2007].
Mitsubishi Electric: "Uplink Multiple Access for LTE-Advanced", 3GPP Draft; R1-082776_ULMA, 3rd Generation Partnership Project (3GPP), Mobile Competence Centre ; 650, Route Des Lucioles ; F-06921 Sophia-Antipolis Cedex ; France, No. Jeju; Aug. 12, 2008, XP050316269, [retrieved on Aug. 12, 2008].
Motorola: "Control Signalling Design for Supporting Carrier Aggregation",3GPP Draft; R1-090792, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318649, [retrieved on Feb. 3, 2009].
Motorola: "PDCCH Scrambling and ACK/NACK Detection", 3GPP Draft; R1080746—PDCCH Scrambling and Acknack Detection, 3rd Generation Partnership Project (3GPP), Mobile Competence Centre ; 650, Route Des Lucioles ; F-06921 Sophia-Antipolis Cedex ; France, vol. RAN WGI, No. Sorrento, Italy; Feb. 15, 2008, XP050109232, [retrieved on Feb. 15, 2008].
NEC Group: "PUCCH allocation for ACK/NACK transmission", 3GPP Draft; R1074169, 3rd Generation Partnership Project (3GPP), Mobile Competence Centre ; 650, Route Des Lucioles ; F-06921 Sophia-Antipolis Cedex ; France, vol. RAN WGI, No. Shanghai, China; 20071002, Oct. 2, 2007, XP050107701, [retrieved on Oct. 2, 2007].
Nokia et al: "L1 control signaling with carrier aggregation in LTE-Advanced", 3GPP Draft; R1-083730, 3rd Generation Partnership Project (3GPP), Mobile Competence Centre ; 650, Route Des Lucioles ; F-06921 Sophia-Antipolis Cedex ; France, No. Prague, Czech Republic; 20080924, Sep. 24, 2008, XP050317069, [retrieved on Sep. 24, 2008].
QUALCOMM Europe: "Open issues on details in support of MIMO (FDD) for Rel-7", 3GPP Draft; R1-062440, 3rd Generation Partnership Project (3GPP), Mobile Competence Centre ; 650, Route Des Lucioles ; F-06921 Sophia-Antipolis Cedex ; France, vol. RAN WG1, No. Tallinn; 20060902, Sep. 2, 2006, XP050102951, [retrieved on Sep. 2, 2006].
QUALCOMM Europe: "UL ACK/NACK assignment procedure", 3GPP Draft; R1-083176, 3rd Generation Partnership Project (3GPP), Mobile Competence Centre ; 650, Route Des Lucioles ; F-06921 Sophia-Antipolis Cedex ; France, No. Jeju; 20080812, Aug. 12, 2008, XP050316608, [retrieved on Aug. . 12, 2008].
QUALCOMM Europe: "UL HARQ Feedback for Multicarrier Operation", 3GPP Draft; R1-092709 UL-ACK MC, 3rd Generation Partnership Project (3GPP), Mobile Competence Centre ; 650, Route Des Lucioles ; F-06921 Sophia-Antipolis Cedex ; France, No. Los Angeles, USA; 20090624, Jun. 24, 2009, XP050351180, [retrieved on Jun. 24, 2009].
Samsung: "LTE uplink ACK channel for downlink MCW MIMO support", 3GPP Draft; R1-071565, Srd Generation Partnership Project (3GPP), Mobile Competence Centre ; 650, Route Des Lucioles ; F-06921 Sophia-Antipolis Cedex ; France, vol. RAN WGI, No. St. Julian; Apr. 3, 2007, XP050105496, [retrieved on Apr. 3, 2007].
Samsung: "Time vs. frequency domain realization of SC-FDMA transmissions", 3GPP Draft; R1-050881 SC-FDMA Realization, 3rd Generation Partnership Project (3GPP), Mobile Competence Centre ; 650, Route Des Lucioles ; F-06921 Sophia-Antipolis Cedex ; France, vol. RAN WG1, No. London, UK; 20050825, Aug. 25, 2005, XP050100506, [retrieved on Aug. 25, 2005].
Samsung: "UL ACK/NAK Transmission in LTE-A", 3GPP Draft; R1-091238 UL ACK NAK, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, XP050338852, [retrieved on Mar. 18, 2009].
Texas Instruments: "Issues on Carrier Aggregation for Advanced E-UTRA", 3GPP Draft; R1-084443, 3rd Generation Partnership Project (3GPP), Mobile Competence Centre ; 650, Route Des Lucioles ; F-06921 Sophia-Antipolis Cedex ; France, No. Prague, Czech Republic; Nov. 5, 2008, XP050317701, [retrieved on Nov. 5, 2008].
ZTE: "Uplink Control Channel Design for LTE-Advanced", 3GPP Draft; R1-091427 Uplink Control, Channel Design for LTE-A, 3RD Generation Partnership Project (3GPP), Mobile Competence Centre ; 650, Route Des Lucioles ; F-06921 Sophia-Antipolis Cedex ; France, No. Seoul, Korea; Mar. 17, 2009, XP050339006, [retrieved on Mar. 17, 2009].
ZTE: "Uplink Control Channel Design for LTE-Advanced",3GPP Draft; R1-090629 Uplink Control Channel Design for LTE-A, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318510, [retrieved on Feb. 3, 2009].
Taiwan Search Report—TW099114299—TIPO—Oct. 6, 2013.

* cited by examiner

● Downlink Grant   ▨ Data Transmission

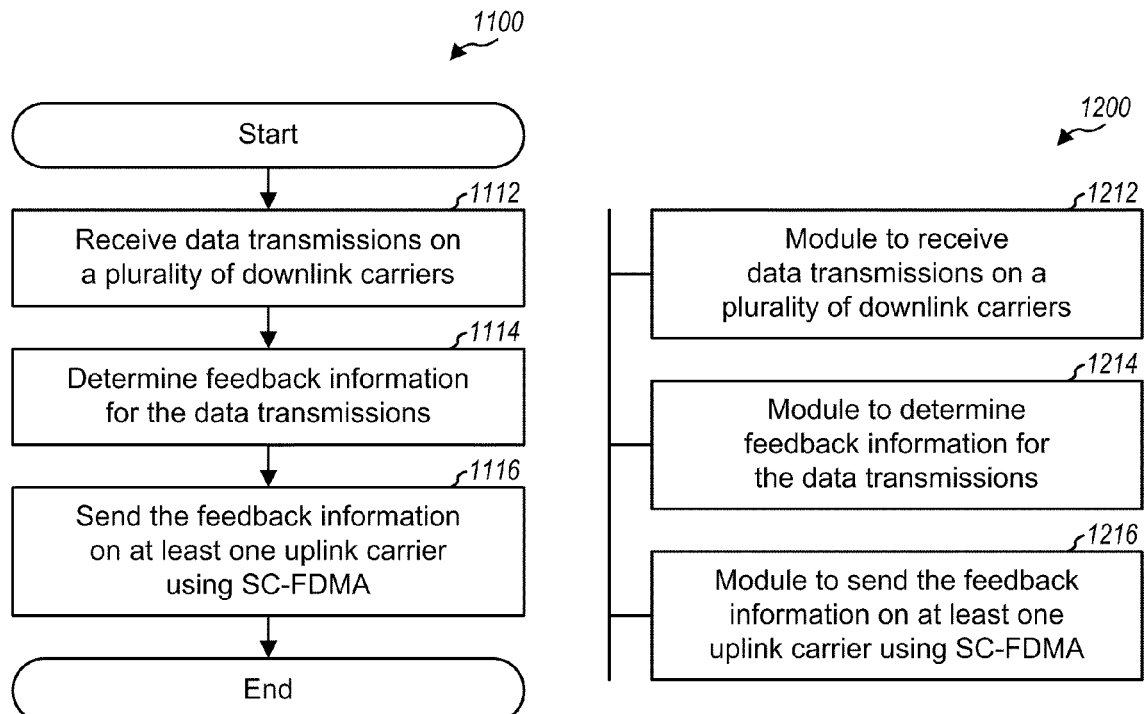
FIG. 11
FIG. 12
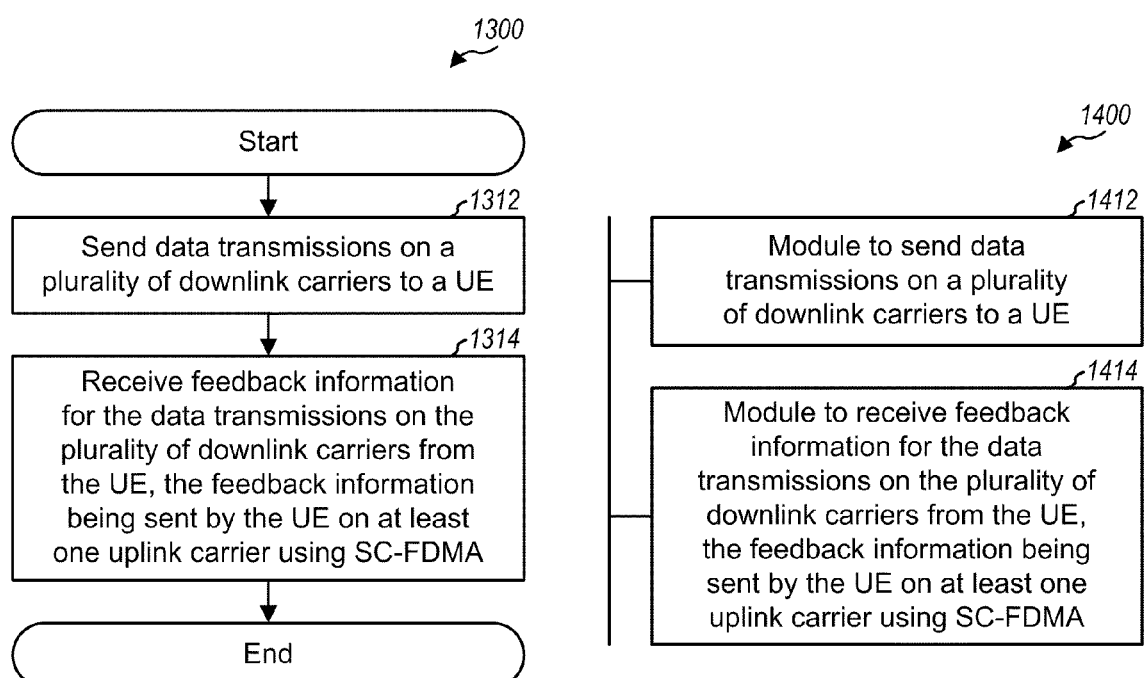
FIG. 13
FIG. 14

TRANSMISSION OF FEEDBACK INFORMATION FOR MULTI-CARRIER OPERATION

The present application claims priority to provisional U.S. Application Ser. No. 61/175,382, entitled "UPLINK HYBRID AUTOMATIC REPEAT REQUEST (HARM) FEEDBACK IN MULTICARRIER OPERATION," filed May 4, 2009, assigned to the assignee hereof and incorporated herein by reference.

BACKGROUND

I. Field

The present disclosure relates generally to communication, and more specifically to techniques for sending feedback information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless system may support operation on multiple carriers. A carrier may refer to a range of frequencies used for communication and may be associated with certain characteristics. For example, a carrier may carry synchronization signals, or may be associated with system information describing operation on the carrier, etc. A carrier may also be referred to as a channel, a frequency channel, etc. A base station may send data on one or more carriers on the downlink to a UE. The UE may send feedback information on the uplink to support data transmission on the downlink. It may be desirable to efficiently send the feedback information on the uplink.

SUMMARY

Techniques for sending feedback information in a wireless communication system supporting multiple carriers on the downlink (or downlink carriers) and one or more carriers on the uplink (or uplink carriers) are described herein. In an aspect, feedback information may be sent on an uplink carrier that may or may not be paired with a downlink carrier on which data transmission is sent. In one design, a UE may receive data transmission on a downlink carrier among a plurality of downlink carriers. The UE may determine feedback information for the data transmission. The feedback information may comprise acknowledgement (ACK) information, channel quality indicator (CQI) information, and/or some other information. The UE may determine an uplink carrier to use to send the feedback information from among a plurality of uplink carriers. The UE may then send the feedback information on the uplink carrier.

In another aspect, feedback information for multiple downlink carriers may be sent on at least one uplink carrier using SC-FDMA. In one design, a UE may receive data transmissions on a plurality of downlink carriers and may determine feedback information (e.g., ACK information, CQI information, etc.) for the data transmissions. The UE may send the feedback information on at least one uplink carrier using SC-FDMA. The UE may send the feedback information with SC-FDMA in various manners, as described below.

A base station may perform complementary processing to recover the feedback information sent by the UE. Various aspects and features of the disclosure are described in further detail below.

BRIEF DESCRIPTION OF THE DRAWINGS

FIG. 11 shows another process for sending feedback information.
FIG. 12 shows another apparatus for sending feedback information.
FIG. 13 shows another process for receiving feedback information.
FIG. 14 shows another apparatus for receiving feedback information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2"

(3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
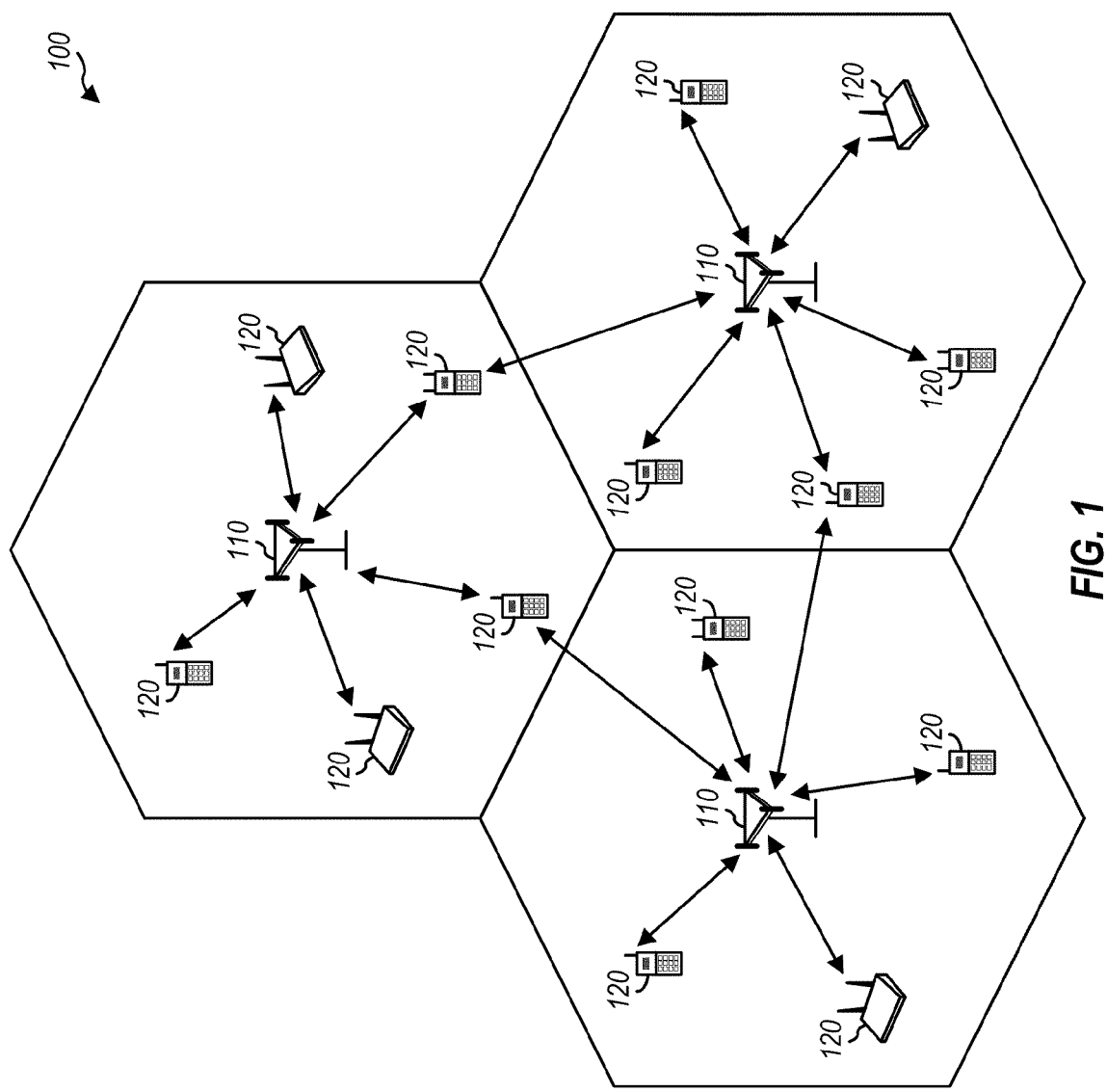
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a Node B, a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

The system may support hybrid automatic retransmission (HARQ) in order to improve reliability of data transmission. For HARQ, a transmitter may send a transmission of a transport block (or packet) and may send one or more additional transmissions, if needed, until the transport block is decoded correctly by a receiver, or the maximum number of transmissions has been sent, or some other termination condition is encountered. After each transmission of the transport block, the receiver may send an acknowledgement (ACK) if the transport block is decoded correctly or a negative acknowledgement (NACK) if the transport block is decoded in error. The transmitter may send another transmission of the transport block if a NACK is received and may terminate transmission of the transport block if an ACK is received. ACK information may comprise ACK and/or NACK and may also be referred to as HARQ feedback.

Figure 2:
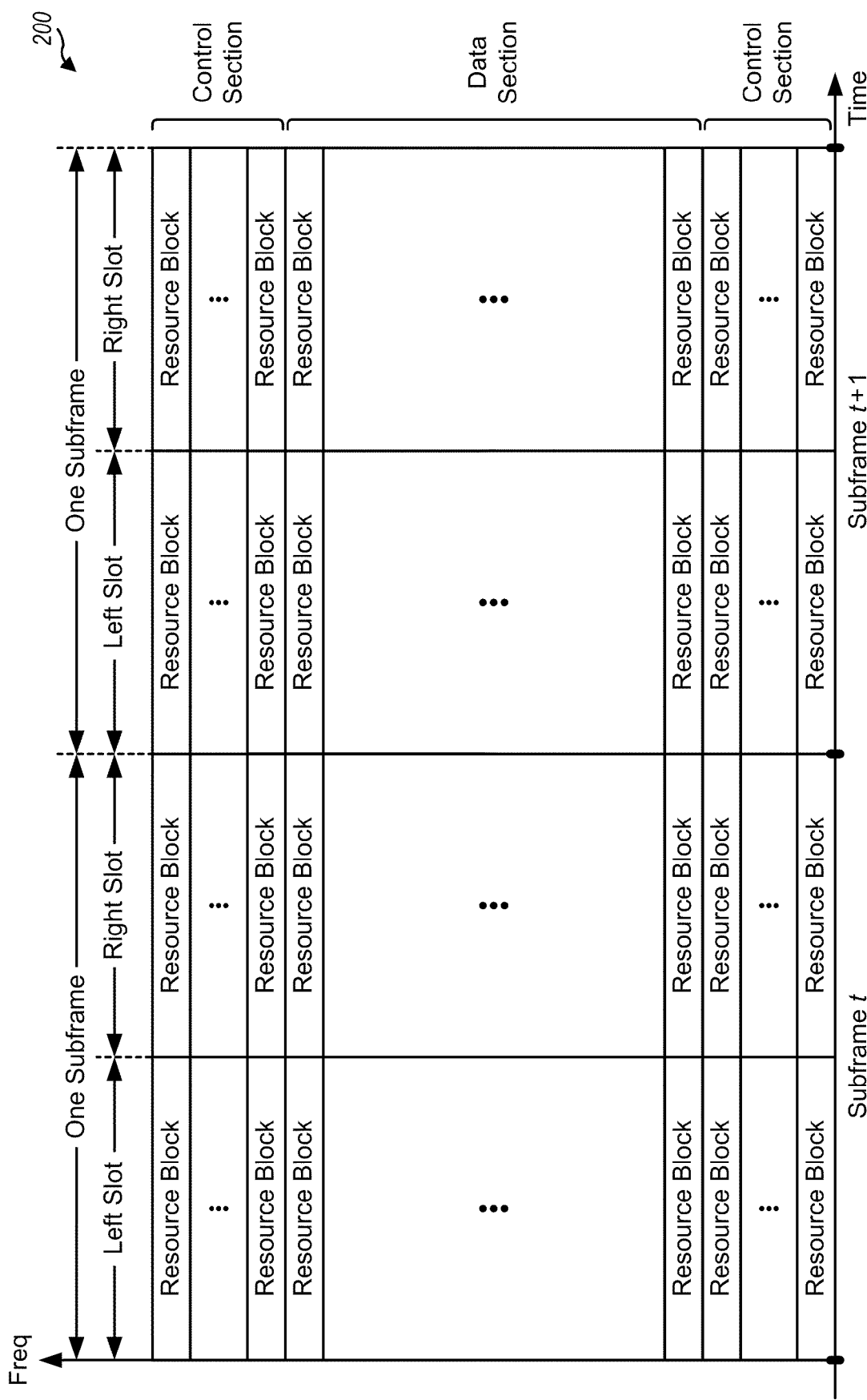
FIG. 2 shows an exemplary transmission structure.

FIG. 2 shows an exemplary transmission structure 200 that may be used for the downlink and uplink. The transmission timeline for each link may be partitioned into units of subframes. A subframe may have a predetermined duration, e.g., one millisecond (ms), and may be partitioned into two slots. Each slot may include six symbol periods for an extended cyclic prefix or seven symbol periods for a normal cyclic prefix.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

For each of the downlink and uplink, multiple resource blocks may be defined in each slot with the $N_{FFT}$ total subcarriers. Each resource block may cover K subcarriers (e.g., K=12 subcarriers) in one slot. The number of resource blocks in each slot may be dependent on the system bandwidth and may range from 6 to 110. On the uplink, the available resource blocks may be divided into a data section and a control section. The control section may be formed at the two edges of the system bandwidth (as shown in FIG. 2) and may have a configurable size. The data section may include all resource blocks not included in the control section. The design in FIG. 2 results in the data section including contiguous subcarriers.

A UE may be assigned resource blocks in the control section to send control information to an eNB. The UE may also be assigned resource blocks in the data section to send data and possibly control information to the eNB. The control information may comprise feedback information, scheduling request, etc. The feedback information may comprise ACK information, CQI information, etc. The UE may send data and/or control information at any given moment. Furthermore, the UE may send ACK information, CQI information, and/or other control information at any given moment. The UE may send only data or both data and control information on a Physical Uplink Shared Channel (PUSCH) on resource blocks in the data section. The UE may send only control information on a Physical Uplink Control Channel (PUCCH) on resource blocks in the control section. Different types of control information may be combined and sent together in order to maintain a single-carrier waveform. For example, ACK information may be sent alone on ACK resources, or with CQI information on CQI resources.

A number of PUCCH formats may be supported, e.g., as shown in Table 1. PUCCH formats 1a and 1b may be used to send one or two bits (e.g., of ACK information) in a single modulation symbol. PUCCH format 2 may be used to send 20 bits (e.g., of CQI or ACK information) in 10 modulation symbols. PUCCH formats 2a and 2b may be used to send 21 or 22 bits (e.g., of both ACK and CQI information) in 11 modulation symbols.

TABLE 1

PUCCH Formats

| PUCCH Format | Modulation Scheme | Number of Bits/Subframe | Number of Modulation Symbols/Subframe |
|---|---|---|---|
| 1a | BPSK | 1 | 1 |
| 1b | QPSK | 2 | 1 |
| 2 | QPSK | 20 | 10 |
| 2a | QPSK + BPSK | 21 | 11 |
| 2b | QPSK + QPSK | 22 | 11 |

Figure 3:
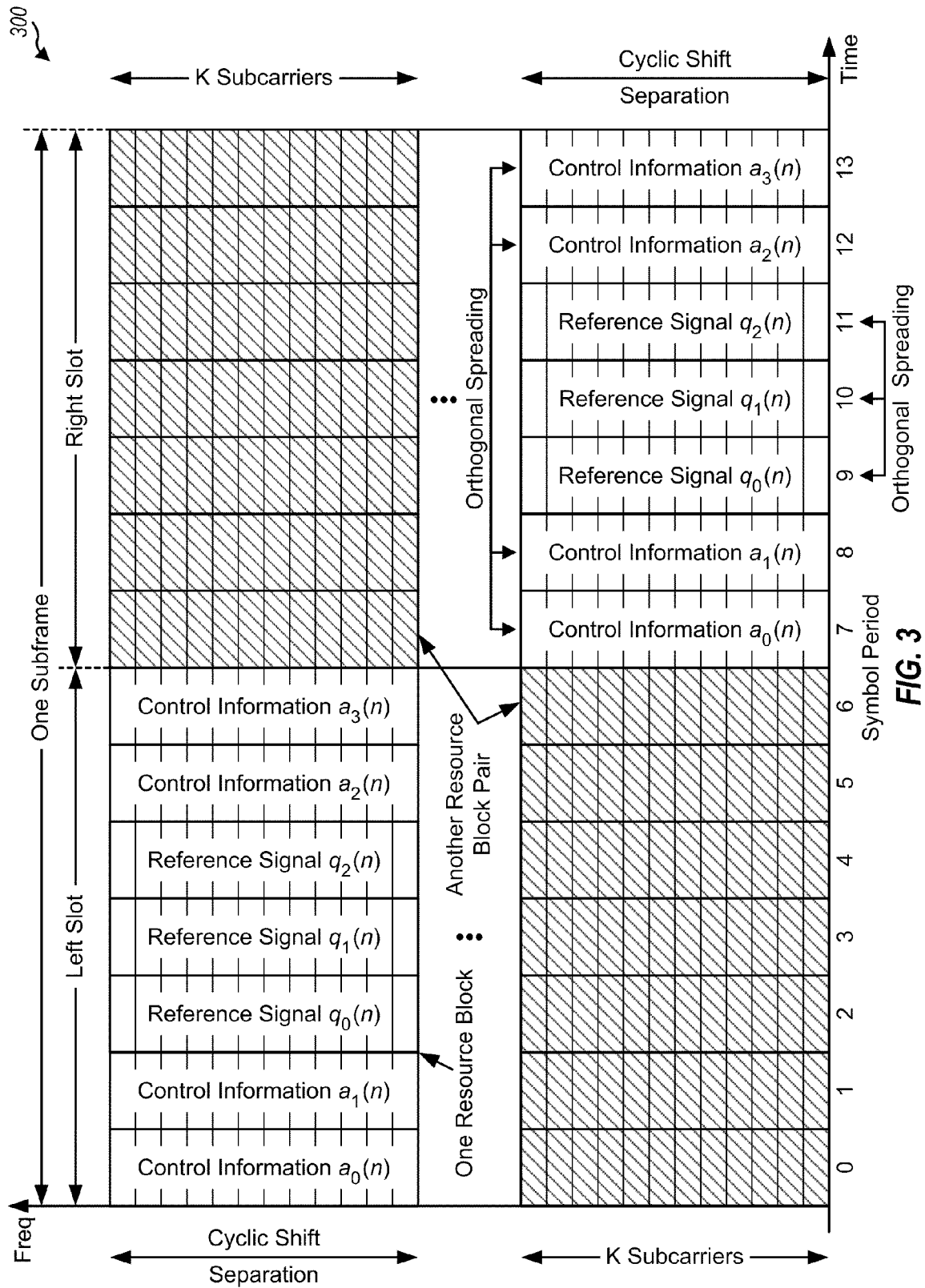
FIG. 3 shows a structure for sending ACK information.

FIG. 3 shows a structure 300 for sending ACK information on the PUCCH for a case in which each slot includes seven symbol periods. For ACK structure 300, a resource block includes four symbol periods for ACK information and three symbol periods for a reference signal. In the left slot, ACK information may be sent in symbol periods 0, 1, 5 and 6, and a reference signal may be sent in symbol periods 2, 3 and 4. In the right slot, ACK information may be sent in symbol periods 7, 8, 12 and 13, and a reference signal may be sent in symbol periods 9, 10 and 11. ACK information and reference signal may also be sent in other manners on a pair of resource blocks.

A UE may process ACK information as follows. The UE may map one or two bits of ACK information to a modulation symbol d(0) based on BPSK or QPSK. The UE may then modulate and spread a reference signal sequence with the modulation symbol, as follows:

$$a_n(k) = w(n) \cdot d(0) \cdot r(k), \text{ for } k=0, \ldots, K-1 \text{ and } n=0, \ldots, N-1, \quad \text{Eq (1)}$$

where r(k) is a reference signal sequence,
w(n) is an orthogonal sequence used to spread ACK information,
$a_n(k)$ is the n-th data sequence for ACK information, and
N is the number of symbol periods in which ACK information is sent.

As shown in equation (1), the reference signal sequence may be modulated with modulation symbol d(0) to obtain a modulated sequence. The modulated sequence may then be spread with orthogonal sequence w(n) to obtain N data sequences, where N=4 in FIG. 3. The N data sequences may be sent in N symbol periods in each resource block, e.g., as shown in FIG. 3.

The UE may generate the reference signal for ACK information, as follows:

$$q_i(k)=w(i)\cdot r(k), \text{ for } k=0,\ldots,K-1 \text{ and } i=0,\ldots,L-1, \quad \text{Eq (2)}$$

where $q_i(k)$ is the i-th pilot sequence for ACK information, and

L is the number of symbol periods in which the reference signal is sent.

As shown in equation (2), the reference signal sequence may be spread with orthogonal sequence w(i) to obtain L pilot sequences, where L=3 in FIG. 3. The L pilot sequences may be sent in L symbol periods in each resource block, e.g., as shown in FIG. 3.

A number of reference signal sequences may be defined based on different cyclic shifts of a base sequence. The base sequence may be a Zadoff-Chu sequence, a pseudo-random sequence, etc. Up to K different reference signal sequences may be obtained with up to K different cyclic shifts of the base sequence, where K is the length of the base sequence. Only a subset of the K reference signal sequences may be selected for use, and the selected reference signal sequences may be spaced apart as much as possible in terms of their cyclic shifts. The reference signal sequences may also be referred to as different cyclic shifts of the base sequence.

The system may support multi-carrier operation with multiple carriers on the downlink and one or more carriers on the uplink. A carrier used for the downlink may be referred to as a downlink carrier, and a carrier used for the uplink may be referred to as an uplink carrier. An eNB may send data transmission on one or more downlink carriers to a UE. The UE may send feedback information on one or more uplink carriers to the eNB. For clarity, much of the description below is for the case in which the feedback information comprises HARQ feedback. Data transmission and HARQ feedback may be sent in various manners.

Figure 4A:
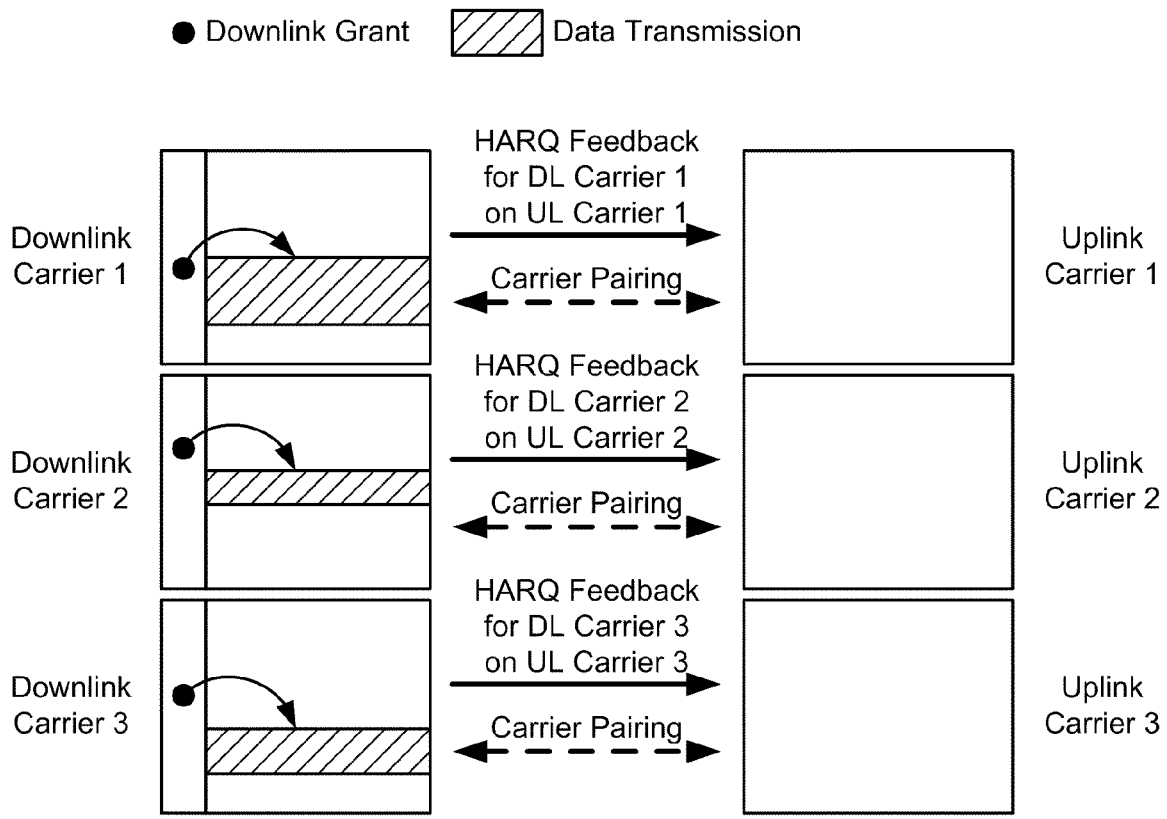
FIG. 4A shows one-to-one feedback mapping.

FIG. 4A shows a design of one-to-one HARQ feedback mapping with symmetric downlink/uplink carrier configuration. In this design, each downlink (DL) carrier is paired with a corresponding uplink (UL) carrier. An eNB may send data transmission on a Physical Downlink Shared Channel (PDSCH) on a particular downlink carrier to a UE. The UE may send HARQ feedback on a corresponding uplink carrier to the eNB.

In the example shown in FIG. 4A, the eNB may send data transmissions on three downlink carriers 1, 2 and 3 to the UE. The eNB may also send three downlink grants for the data transmissions on the three downlink carriers, one downlink grant for the data transmission on each downlink carrier. Each downlink grant may include pertinent parameters (e.g., modulation and coding scheme, resource blocks, etc.) used for data transmission to the UE. The UE may receive and decode the data transmission on each downlink carrier based on the downlink grant for that data transmission and may send HARQ feedback on the corresponding uplink carrier.

For one-to-one HARQ feedback mapping, HARQ feedback for a single downlink carrier may be sent on a single uplink carrier. A downlink grant may be sent on a downlink carrier used for data transmission or on a different downlink carrier. In one design, HARQ feedback may be sent on an uplink carrier paired with the downlink carrier on which the downlink grant is sent, regardless of where the data transmission is sent. The uplink carrier used for HARQ feedback may then be paired with the downlink carrier on which a downlink grant is sent. Furthermore, HARQ feedback may be sent on an ACK resource identified based on downlink resource used to send the downlink grant, as described below.

Figure 4B:
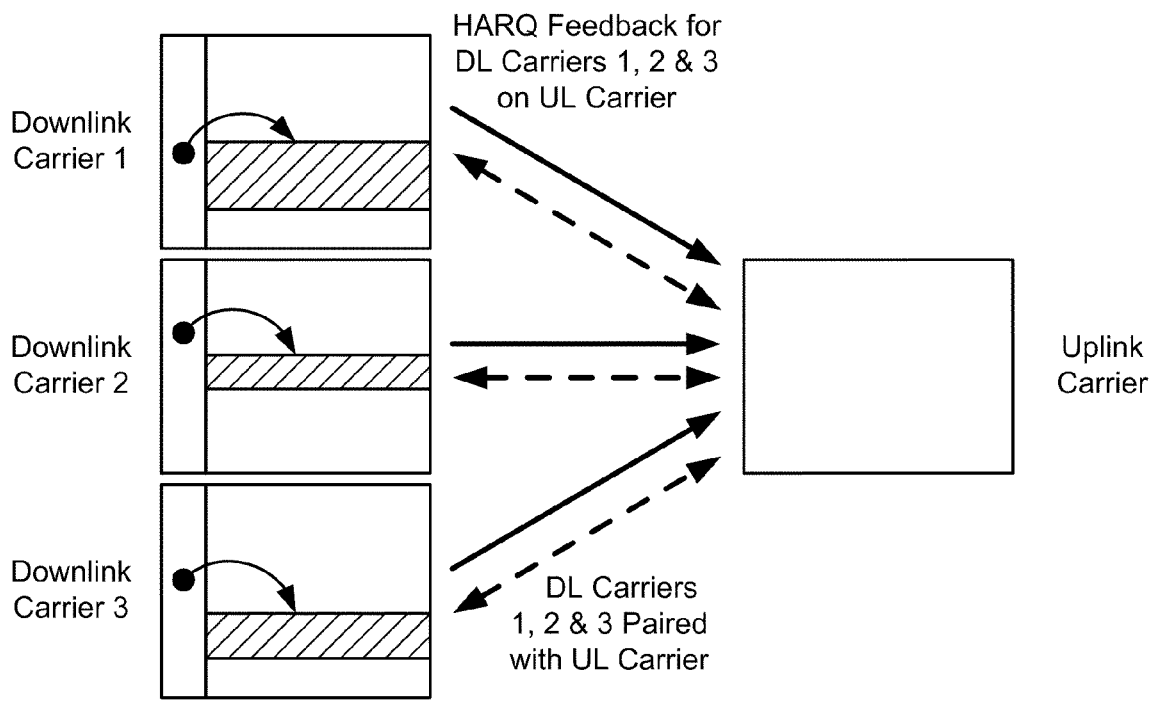
FIG. 4B shows many-to-one feedback mapping.

FIG. 4B shows a design of many-to-one HARQ feedback mapping with asymmetric downlink/uplink carrier configuration. In this design, all downlink carriers may be paired with a single uplink carrier. An eNB may send data transmission on one or more downlink carriers to a UE. The UE may send HARQ feedback on the uplink carrier to the eNB.

Figure 4C:
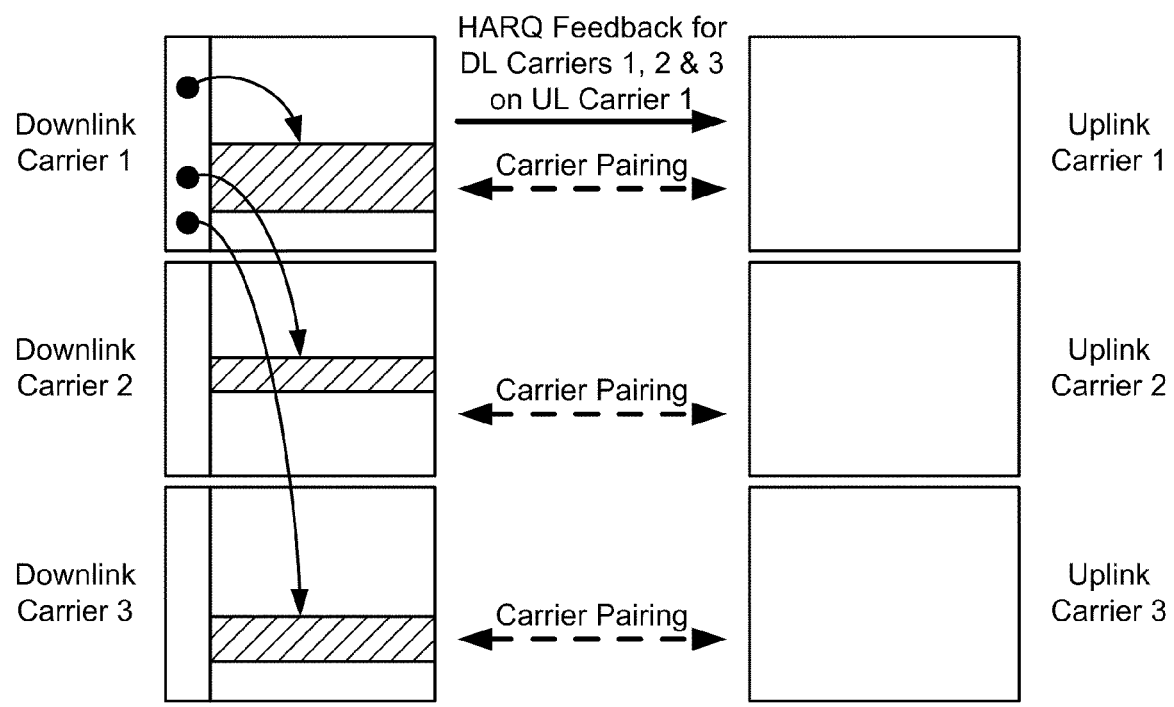
FIG. 4C shows another many-to-one feedback mapping.

FIG. 4C shows a design of many-to-one HARQ feedback mapping with symmetric downlink/uplink carrier configuration and cross-carrier control operation. Each downlink carrier may be paired with a corresponding uplink carrier. An eNB may send data transmission on a particular downlink carrier to a UE. The UE may send HARQ feedback on an uplink carrier that may or may not be paired with the downlink carrier.

In the example shown in FIG. 4C, the eNB may send data transmissions on three downlink carriers 1, 2 and 3 to the UE. The eNB may also send either three per-carrier downlink grants or a single multi-carrier downlink grant for the data transmissions on the three downlink carriers. A per-carrier downlink grant may convey pertinent parameters for data transmission on a single downlink carrier. A multi-carrier downlink grant may convey pertinent parameters for data transmissions on multiple downlink carriers. The UE may receive and decode the data transmissions on all downlink carriers and may send HARQ feedback on a designated uplink carrier.

In general, for many-to-one HARQ feedback mapping (e.g., as shown in FIGS. 4B and 4C), HARQ feedback for multiple downlink carriers may be sent on a single uplink carrier. HARQ feedback for a given downlink carrier may be sent on an uplink carrier that may or may not be paired with the downlink carrier. Many-to-one HARQ feedback mapping may be used for (i) asymmetric downlink/uplink carrier configuration where the number of downlink carriers is larger than the number of uplink carriers and/or (ii) cross-carrier control operation regardless of the downlink/uplink carrier configuration.

An eNB may send zero or more transmissions of downlink control information (DCI) on each downlink carrier. Each DCI may be sent on one or more Control Channel Elements (CCEs) for a Physical Downlink Control Channel (PDCCH), which may be sent in the first M symbol periods of a subframe, where M may be 1, 2 or 3. Each CCE may include nine resource element groups (REGs), and each REG may include four resource elements. Each resource element may correspond to one subcarrier in one symbol period and may be used to send one modulation symbol. A DCI may carry a per-carrier downlink grant or a multi-carrier downlink grant for a UE. The UE may send HARQ feedback on ACK resources determined based on the first CCE used to send DCI carrying a downlink grant for the UE, as described below.

In an aspect, HARQ feedback may be sent on an uplink carrier that may or may not be paired with a downlink carrier on which data transmission is sent. A scheme may be used to determine which uplink carrier to use to send HARQ feedback for data transmission on a given downlink carrier in multi-carrier operation.

In a first design, HARQ feedback may be sent on a designated uplink carrier based on many-to-one HARQ feedback mapping, e.g., as shown in FIG. 4B or 4C. The designated uplink carrier may be conveyed in various manners. In one design, DCI for data transmissions on multiple downlink carriers may be sent on a single downlink carrier, e.g., as shown in FIG. 4C. HARQ feedback for all downlink carriers may then be sent on the uplink carrier that is paired with the downlink carrier used to send the DCI. In another design, the designated uplink carrier used to send HARQ feedback may be signaled to a specific UE, e.g., via Radio Resource Control (RRC) signaling, or DCI, or some other mechanism.

In a second design, HARQ feedback may be sent based on either uplink-downlink carrier pairing or a designated uplink carrier. Which HARQ feedback mapping to use may be configurable and may be conveyed in various manners. In one design, a flag may be used to indicate whether to send HARQ feedback using uplink-downlink carrier pairing or a designated uplink carrier. The flag may be set to (i) a first value (e.g., 0) to indicate that HARQ feedback should be sent on an uplink carrier paired with a downlink carrier or (ii) a second value (e.g., 1) to indicate that HARQ feedback should be sent on a designated uplink carrier.

The flag may be sent in various manners. In one design, the flag may be broadcast in system information to all UEs. In another design, the flag may be sent to a specific UE, e.g., via RRC signaling, or DCI, or some other mechanism. A new UE that supports the flag may send HARQ feedback on the paired uplink carrier or the designated uplink carrier, as indicated by the flag. A legacy UE that does not support the flag may send HARQ feedback on the paired uplink carrier.

In another aspect, HARQ feedback for multiple downlink carriers (which may also be referred to as multi-carrier HARQ feedback) may be sent on at least one uplink carrier using SC-FDMA. For SC-FDMA, modulation symbols may be transformed from the time domain to the frequency domain with a discrete Fourier transform (DFT) to obtain frequency-domain symbols. The frequency-domain symbols may be mapped to subcarriers used for transmission, and zero symbols with signal value of zero may be mapped to subcarriers not used for transmission. The mapped symbols may then be transformed from the frequency domain to the time domain with an inverse fast Fourier transform (IFFT) to obtain time-domain samples for an SC-FDMA symbol. SC-FDMA may thus be characterized by modulation symbols being sent in the time domain and converted to the frequency domain with DFT prior to mapping to subcarriers. SC-FDMA is different from OFDM, which may be characterized by modulation symbols being sent in the frequency domain and mapped directly to subcarriers, without going through a DFT. HARQ feedback may be sent with SC-FDMA in various manners.

In one design, HARQ feedback for multiple downlink carriers may be sent on an uplink carrier based on relaxed SC-FDMA, which may be one version of SC-FDMA. For relaxed SC-FDMA, HARQ feedback for different downlink carriers may be sent on different ACK resources such that a single-carrier waveform may not be maintained for the uplink transmission. A single-carrier waveform may be maintained if an uplink transmission is sent on contiguous subcarriers and if a single reference signal sequence is used for spreading across frequency.

In a first design of relaxed SC-FDMA, different downlink carriers may be mapped to different frequency regions of an uplink carrier, one frequency region for each downlink carrier. Each frequency region may correspond to a different set of one or more resource blocks. The different frequency regions may be defined by different frequency offsets from a reference frequency, which may be the boundary between the data and control regions.

Per-carrier downlink grants may be sent for data transmissions on multiple downlink carriers. In this case, HARQ feedback for data transmission on each downlink carrier may be sent on ACK resource determined based on the first CCE in which the corresponding per-carrier downlink grant is sent.

A multi-carrier downlink grant may also be sent for data transmissions on multiple downlink carriers. HARQ feedback may be sent in various manners for this case. In one design, HARQ feedback for each downlink carrier may be sent on ACK resource determined based on (i) the first CCE in which DCI carrying the multi-carrier downlink grant is sent and (ii) the downlink carrier on which data transmission is sent. For example, the first CCE may determine the orthogonal sequence and the reference signal sequence, and the downlink carrier on which the data transmission is sent may determine the frequency region. In this design, the first CCE used for the DCI carrying the multi-carrier downlink grant should not be reused as the first CCE on another downlink carrier for DCI carrying another downlink grant for another UE in order to avoid multiple downlink grants being mapped to the same ACK resource. In another design, HARQ feedback for each downlink carrier may be sent on ACK resource determined based on the CCEs in which the DCI carrying the multi-carrier downlink grant is sent. The DCI carrying the multi-carrier downlink grant may be for data transmissions on Q downlink carriers, where Q is greater than one. HARQ feedback for the Q downlink carriers may be sent on Q ACK resources corresponding to Q CCEs starting with the first CCE in which the DCI carrying the multi-carrier downlink grant is sent. Each CCE may be mapped to different ACK resource. Q CCEs may be reserved or used to send the DCI carrying the multi-carrier downlink grant to ensure a sufficient number of ACK resources for multi-carrier HARQ feedback.

In a second design of relaxed SC-FDMA, a shared frequency region on an uplink carrier may be used to send HARQ feedback for multiple downlink carriers. Per-carrier downlink grants may be sent for data transmissions on multiple downlink carriers. HARQ feedback for data transmission on each downlink carrier may be sent on ACK resource determined based on the first CCE used for DCI carrying a downlink grant for the data transmission on that downlink carrier. The first CCE used for DCI on one carrier should not be reused as the first CCE for DCI on another carrier in order to avoid multiple downlink grants mapping to the same ACK resource. A scheduler may satisfy this restriction by sending DCIs on appropriate CCEs. Alternatively, a multi-carrier downlink grant may be sent for data transmissions on multiple (Q) downlink carriers. In this case, Q CCEs may be reserved or used for DCI carrying the multi-carrier downlink grant to provide Q ACK resources for HARQ feedback for the Q downlink carriers.

Figure 5:
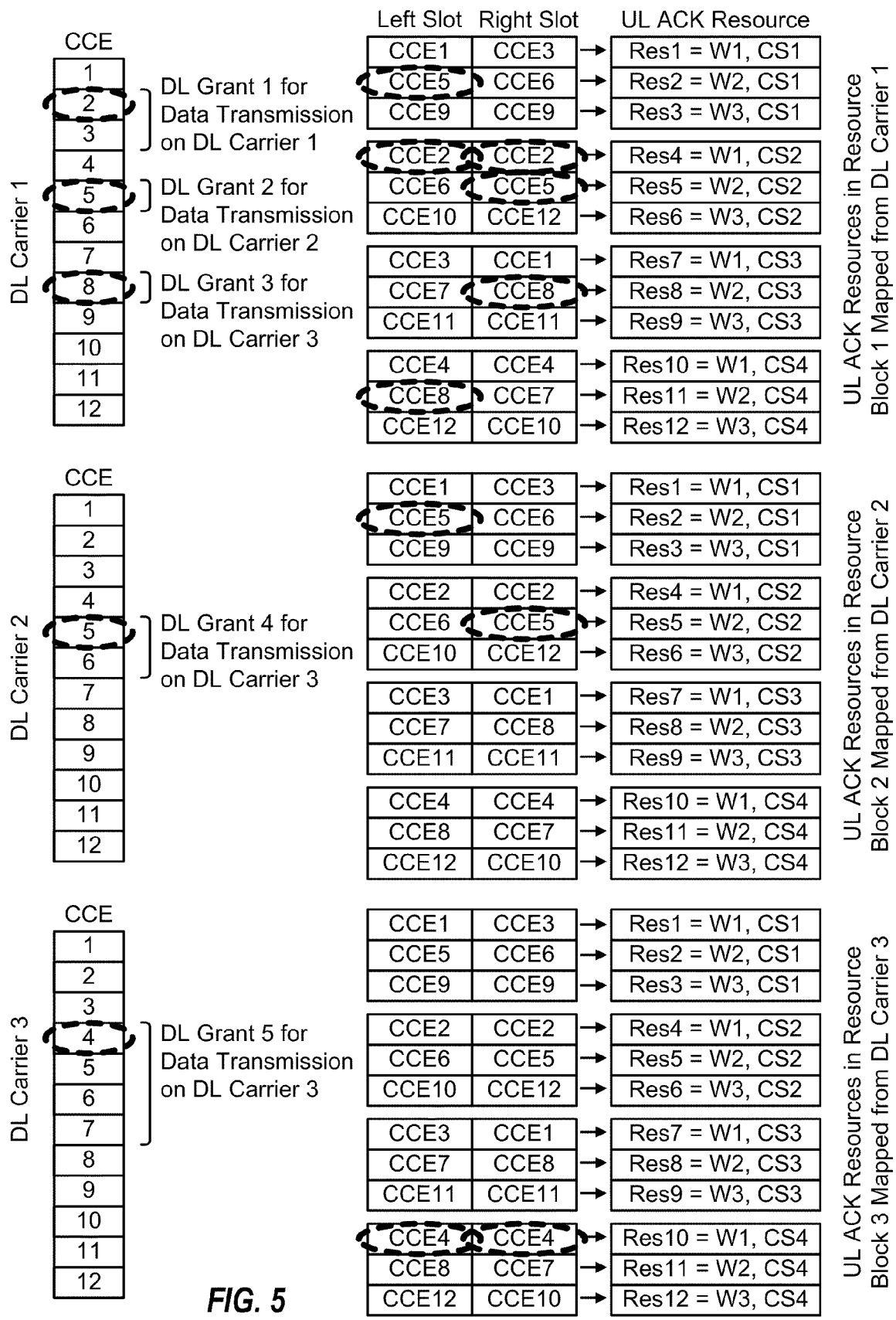
FIG. 5 shows transmission of feedback information with relaxed SC-FDMA.

FIG. 5 shows a design of sending HARQ feedback for multiple downlink carriers with relaxed SC-FDMA using different frequency regions of an uplink carrier. In the example shown in FIG. 5, three downlink carriers may be used to send downlink grants and data transmissions, and one uplink carrier may be used to send HARQ feedback. Each downlink carrier may include 12 CCEs with indices of 1 through 12. The three downlink carriers may thus include a total of 36 CCEs, which may be mapped to 36 ACK indices.

Each CCE for each downlink carrier may be mapped to one ACK resource in the left slot and one ACK resource in the right slot of a subframe. Each ACK resource may be associated with a specific orthogonal sequence denoted as $W_x$, a specific reference signal sequence denoted as $CS_y$, and a specific resource block denoted as $RB_z$, where x, y and z may be indices for orthogonal sequence, reference signal sequence, and resource block, respectively. Each ACK resource may thus be identified by a (Wx, CSy, RBz) tuple. For the example shown in FIG. 5, 12 ACK resources denoted as Res1 through Res12 may be defined for a given resource block with four reference signal sequences CS1 through CS4 and three orthogonal sequences W1 through W3. The four reference signal sequences may correspond to four different (e.g., one zero and three non-zero) cyclic shifts of the base sequence. The three orthogonal sequences may be different Walsh sequences of length four for the case in which HARQ feedback is sent in four symbol periods, as shown in FIG. 3.

A total of 36 ACK resources may be defined with three resource blocks RB1, RB2 and RB3 in each slot. The 12 CCEs for downlink carrier 1 may be mapped to the 12 ACK resources in resource block RB1. The 12 CCEs for downlink carrier 2 may be mapped to the 12 ACK resources in resource block RB2. The 12 CCEs for downlink carrier 3 may be mapped to the 12 ACK resources in resource block RB3. The CCE mapped to each ACK resource is shown in FIG. 5. For example, CCE1 for downlink carrier 1 may be mapped to ACK resource Res1 in the left slot and to ACK resource Res7 in the right slot in resource block 1.

FIG. 5 shows a design in which the 12 CCEs for each downlink carrier are assigned indices of 1 through 12. In another design, the CCEs for all downlink carriers mapped to the same uplink carrier may be assigned unique indices based on common CCE numbering across all of these downlink carriers. For example, if the three downlink carriers in FIG. 5 are mapped to the same uplink carrier, then the 12 CCEs for downlink carrier 1 may be assigned indices 1 through 12, the 12 CCEs for downlink carrier 2 may be assigned indices 13 through 24, and the 12 CCEs for downlink carrier 3 may be assigned indices 25 through 36. The use of the common CCE numbering may avoid collisions when HARQ feedback for multiple downlink carriers are mapped to the same uplink carrier.

In the example shown in FIG. 5, five per-carrier downlink grants are sent for data transmissions on downlink carriers 1, 2 and 3. Each downlink grant is sent in DCI on one or more CCEs of one downlink carrier. HARQ feedback for data transmission on each downlink carrier is sent on ACK resource determined based on the first CCE used for the DCI carrying the downlink grant for the data transmission.

For example, DCI carrying downlink grant 1 is sent in CCEs 2 and 3 of downlink carrier 1. Downlink grant 1 conveys parameters for data transmission on downlink carrier 1. HARQ feedback for this data transmission is sent on ACK resources mapped to CCE 2, which is the first CCE used for the DCI carrying downlink grant 1. In particular, HARQ feedback is sent on ACK resource Res4 in the left slot and also on ACK resource Res4 in the right slot, as shown in FIG. 5. DCI carrying downlink grant 2 is sent in CCE 5 of downlink carrier 1, and downlink grant 2 conveys parameters for data transmission on downlink carrier 2. HARQ feedback for this data transmission is sent on ACK resource Res2 in the left slot and on ACK resource Res5 in the right slot, which are mapped to CCE 5 corresponding to the first CCE used for the DCI carrying downlink grant 2. Downlink grants and HARQ feedback for other data transmissions are shown in FIG. 5.

In another design, HARQ feedback for multiple downlink carriers may be sent on an uplink carrier based on strict SC-FDMA, which may be another version of SC-FDMA. For strict SC-FDMA, HARQ feedback for different downlink carriers may be sent such that single-carrier waveform may be maintained for an uplink transmission.

In a first design of strict SC-FDMA, HARQ feedback for multiple downlink carriers may be sent with ACK bundling. An eNB may send data transmissions on multiple downlink carriers to a UE. The UE may decode the data transmission on each downlink carrier and may obtain an ACK or NACK for the data transmission. For ACK bundling, the ACKs and/or NACKs for all data transmissions may be combined (e.g., with a logical AND operation) to obtain a single ACK or NACK, which may be referred to as a bundled ACK or NACK. In particular, a bundled ACK may be generated for all data transmissions if ACKs are obtained for all data transmissions, and a bundled NACK may be generated if NACK is obtained for any data transmission. The UE may send HARQ feedback comprising the bundled ACK or NACK on a single ACK resource. This ACK resource may be determined based on a specific rule, e.g., the first CCE of the lowest downlink carrier used for DCI carrying a downlink grant for the UE. The eNB may resend all data transmissions if a bundled NACK is received and may terminate all data transmissions if a bundled ACK is received.

In a second design of strict SC-FDMA, HARQ feedback for multiple downlink carriers may be sent using PUCCH format 2 shown in Table 1. For PUCCH format 2, up to twenty bits may be sent on a pair of resource blocks in one subframe. This may be achieved by mapping the twenty bits to ten QPSK modulation symbols and modulating a reference signal sequence with each of the ten modulation symbols to generate ten data sequences. Five data sequences may be sent in five symbol periods of a first resource block, and the remaining five data sequences may be sent in five symbol periods of a second resource block. Twenty bits can accommodate a number of ACKs/NACKs for HARQ feedback.

In one design, a separate frequency region in the control section may be used to send HARQ feedback using PUCCH format 2. This separate frequency region may be specified by an offset from either a frequency region normally used for HARQ feedback or a UE-specific frequency location. This separate frequency region may be conveyed to a UE via RRC signaling or some other means. Several UEs may share the same frequency region for sending HARQ feedback using PUCCH format 2 in order to reduce overhead. These UEs would not be scheduled for data transmission on the downlink at the same time to avoid multiple UEs using the same frequency region for HARQ feedback. A UE may send HARQ feedback either (i) on normal ACK resource using PUCCH format 1a or 1b or (ii) in the separate frequency region using PUCCH format 2, depending on the number of ACKs/NACKs to send.

In a third design of strict SC-FDMA, HARQ feedback for multiple downlink carriers may be sent using PUCCH format 1b shown in Table 1. For PUCCH format 1b, two bits may be sent on a pair of resource blocks with one reference signal sequence and one orthogonal sequence, as described above for FIG. 3. More than two bits may be sent in several manners.

In one design, more than two bits may be sent using PUCCH format 1b by removing orthogonal spreading. In this design, a UE may be assigned a reference signal sequence for sending HARQ feedback. The UE may send up to 16 bits of HARQ feedback by mapping these 16 bits to eight QPSK modulation symbols, modulating the reference signal sequence with each of the eight modulation symbols to generate eight data sequences, and sending the eight data sequences in eight symbol periods of two resource blocks. In one design, the reference signal sequence assigned to the UE may be determined based on (i) the first CCE in the lowest downlink carrier used for DCI carrying a per-carrier downlink grant for the UE or (ii) the first CCE used for DCI carrying a multi-carrier downlink grant for the UE.

A scheduler may ensure that a reference signal sequence reserved for the UE to send HARQ feedback without orthogonal spreading is not assigned to another UE for sending HARQ feedback in the same resource block. This may be achieved by sending DCI for another UE on a first CCE that does not map to the reserved reference signal sequence. CCEs that map to the reserved reference signal sequence may be used to send DCIs for other UEs, but not as the first CCE. Alternatively, a CCE structure may be defined with certain CCEs mapping to the same reference signal sequence. In this case, a multi-carrier downlink grant or multiple per-carrier downlink grants may be sent to the UE on the CCEs, and the reference signal sequence mapped to these CCEs may be used to send HARQ feedback without orthogonal spreading.

When orthogonal spreading is removed, the reference signal sequences may experience undesirable correlation properties in non-flat fading channels. This effect may be mitigated by ensuring that the reference signal sequence used to send HARQ feedback without orthogonal spreading has certain cyclic shift gaps to other reference signal sequences used to send HARQ feedback in the same resource block.

In another design, more than two bits may be sent using PUCCH format 1b by reducing orthogonal spreading with an orthogonal sequence of length two instead of four. In this design, two UEs may be assigned the same reference signal sequence but different orthogonal sequences of length two for sending HARQ feedback. Each UE may send up to eight bits of HARQ feedback by mapping these eight bits to four QPSK modulation symbols, modulating and spreading each modulation symbol to generate two data sequences, and sending eight data sequences for the four modulation symbols in eight symbol periods of two resource blocks. In one design, the reference signal sequence and the orthogonal sequence assigned to a UE may be determined based on (i) the first CCE in the lowest downlink carrier used for DCI carrying a per-carrier downlink grant for the UE or (ii) the first CCE used for DCI carrying a multi-carrier downlink grant for the UE.

A scheduler may reserve a reference signal sequence and a short orthogonal sequence for a UE to send HARQ feedback with reduced orthogonal spreading. This short orthogonal sequence of length two may correspond to two normal orthogonal sequences of length four. The scheduler may ensure that the reference signal sequence and the two normal orthogonal sequences reserved for the UE are not assigned to another UE for sending HARQ feedback on the same resource block. This may be achieved by sending DCI for another UE on a first CCE that does not map to the reserved reference signal sequence and normal orthogonal sequences. CCEs that map to the reserved reference signal sequence and normal orthogonal sequences may be used to send DCIs for other UEs, but not as the first CCEs.

Figure 6:
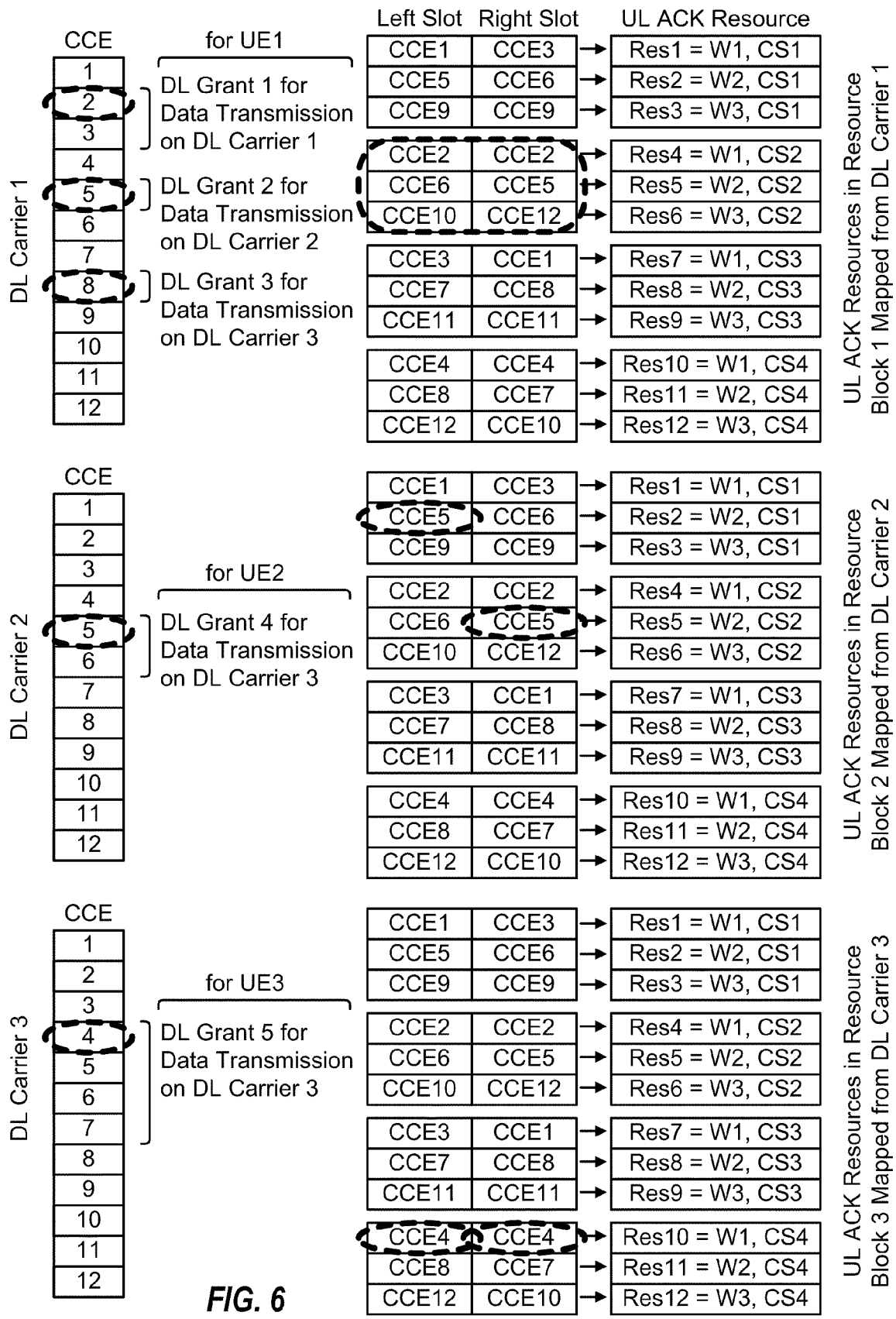
FIG. 6 shows transmission of feedback information with strict SC-FDMA.

FIG. 6 shows a design of sending HARQ feedback with strict SC-FDMA. In the example shown in FIG. 6, three downlink carriers may be used to send downlink grants and data transmissions, and one uplink carrier may be used to send HARQ feedback. Each downlink carrier may include 12 CCEs, and 36 total CCEs for the three downlink carriers may be mapped to 36 ACK indices. Each CCE may be mapped to one ACK resource in the left slot and one ACK resource in the right slot of a subframe, as shown in FIG. 6.

In the example shown in FIG. 6, UE 1 is scheduled for data transmissions on all three downlink carriers. DCI carrying downlink grant 1 for UE 1 is sent in CCEs 2 and 3 of downlink carrier 1, another DCI carrying downlink grant 2 for UE 1 is sent in CCE 5 of downlink carrier 1, and yet another DCI carrying downlink grant 3 for UE 1 is sent in CCE 8 of downlink carrier 1. Downlink grants 1, 2 and 3 convey parameters for data transmissions on downlink carriers 1, 2 and 3, respectively. UE 1 sends HARQ feedback for the data transmissions on the three downlink carriers with relaxed SC-FDMA using PUCCH format 1b and no orthogonal spreading. UE 1 is assigned reference signal sequence CS2, which is mapped to the first CCE 2 used for DCI carrying downlink grant 1. UE 1 sends HARQ feedback for all three downlink carriers using reference signal sequence CS2 and no orthogonal spreading.

Reference signal sequence CS2 is used for ACK resources Res4, Res5 and Res6 that map to CCEs 2, 6 and 10 in the left slot and to CCEs 2, 5 and 12 in the right slot. CCEs 5, 6, 10 and 12 may not be used as the first CCE for DCI for another UE to avoid another UE using reference signal sequence CS2 in either slot. However, CCEs 5, 6, 10 and 12 may be used as non-starting CCEs for DCIs. For example, another DCI may be sent in CCEs 4, 5 and 6.

In one design, a decision on whether to send HARQ feedback without orthogonal spreading or with reduced orthogonal spreading may be dependent on the number of ACKs/NACKs to send by a UE. For example, reduced orthogonal spreading may be used if four or fewer ACKs/NACKs are to be sent, and no orthogonal spreading may be used if more than four ACKs/NACKs are to be sent.

For both relaxed SC-FDMA and strict SC-FDMA, a number of UEs may send HARQ feedback on the same resource block by using different reference signal sequences and possibly different orthogonal sequences. To reduce interference between the UEs sharing the same resource block, one or more reference signal sequences may be removed. This may be especially desirable to reduce interference to a UE sending HARQ feedback without orthogonal spreading or with reduced orthogonal spreading.

As noted above, a UE may send both HARQ feedback and data in a given slot. In one design, the UE may send both HARQ feedback and data on the PUSCH based on strict SC-FDMA. In another design, the UE may send data on the PUSCH and may also send HARQ feedback on the PUCCH based on relaxed SC-FDMA. The UE may also send HARQ feedback and data in other manners.

In another design, HARQ feedback for multiple downlink carriers may be sent on at least one uplink carrier with channel selection. A UE may be assigned multiple (S) pairs of ACK resources in a subframe, with each pair including one ACK resource in each slot of the subframe. The S pairs of ACK resources may be associated with S CCEs used to send one or more downlink grants for the UE (e.g., as shown in FIG. 5 or 6) or may be determined in other manners. The UE may have B ACKs/NACKs to send for data transmissions on multiple downlink carriers. The B ACKs/NACKs may be for (i) B transport blocks sent on B downlink carriers, one transport block per downlink carrier, or (ii) B transport blocks sent on B/2 downlink carriers with multiple-input multiple-output (MIMO), two transport blocks per downlink carrier, or (iii) B transport blocks sent on one or more downlink carriers in other manners. For MIMO, P transport blocks may be sent simultaneously on P layers, one transport block per layer, where P may be equal to 1, 2, etc. The P layers may be formed with a precoding matrix applied to data by an eNB prior to transmission of the data on the downlink.

In one design of ACK transmission with channel selection, the UE may select one of the S pairs of ACK resources as well as a particular signal value to send on the selected pair of ACK resources based on the B ACKs/NACKs to send by the UE. In one design, a mapping table with $2^B$ entries may be defined, one entry for each of the $2^B$ possible combinations of the B ACKs/NACKs. For example, a first entry in the mapping table may be for a combination of B ACKs, a second entry may be for a combination of B−1 ACKs followed by a NACK, a third entry may be for a combination of B−2 ACKs, followed by a NACK, followed by an ACK, etc. Each entry of the mapping table may be associated with a specific pair of ACK resources to use (from among the S pairs of ACK resources) and a specific signal value to send on this pair of ACK resources.

Table 2 shows an exemplary mapping table for mapping B ACKs/NACKs to an ACK resource and a signal value. In general, each combination of ACKs/NACKs may be mapped to any suitable combination of ACK resource and signal value.

TABLE 2

Mapping Table

| ACKs/NACKs | | | | ACK Resource | Signal Value |
|---|---|---|---|---|---|
| ACK | ACK | ... ACK | ACK | Resource 1 | Value x |
| ACK | ACK | ... ACK | NACK | Resource 2 | Value y |
| ACK | ACK | ... NACK | ACK | Resource 3 | Value x |
| . | . | . | . | . | . |
| . | . | . | . | . | . |
| . | . | . | . | . | . |
| NACK | NACK | ... NACK | NACK | Resource S | Value y |

As an example, ten transport blocks may be sent on five downlink carriers with MIMO, two transport blocks per downlink carrier. Five pairs of ACK resources may be assigned to the UE. A mapping table with $2^{10}=1024$ entries may be defined, one entry for each of the 1024 possible combination of the ten ACKs/NACKs. Each entry in the mapping table may be associated with one of the five pairs of ACK resources as well as a specific 2-bit value to send on this pair of ACK resources. The UE may send ten ACKs/NACKs for the ten transport blocks by (i) looking up the mapping table with the specific combination of ACKs/NACKs to send, (ii) determining which pair of ACK resources and which signal value to use, and (iii) sending the signal value on this pair of ACK resources.

The S pairs of ACK resources may be considered as S channels for ACK information. Channel selection refers to the selection of a particular pair of ACK resources or channel on which to send ACK information. Channel selection may enable transmission of more ACKs/NACKs for a given number of ACK resources, e.g., using only one channel. This may be achieved by mapping multiple combinations of ACKs/NACKs (which may be likely to be mutually exclusive) to the same combination of channel and signal value. Channel selection may also avoid the use of all S channels at the same time, which may require more transmit power and more power amplifier (PA) back-off since a single-carrier waveform is not preserved.

In one design, channel selection may be used with orthogonal spreading. For the design shown in FIG. 3, a single ACK/NACK or two ACKs/NACKs may be mapped to a single modulation symbol d(0) based on BPSK or QPSK, respectively. This modulation symbol may be spread with orthogonal sequence w(i) of length four as shown in equation (2) and transmitted on each of a pair of ACK resources. Up to four combinations of ACKs/NACKs may be supported with one modulation symbol for ACK information sent with orthogonal spreading.

In another design, channel selection may be used without orthogonal spreading. Up to eight modulation symbols may be sent on a pair of ACK resources by removing the orthogonal spreading, as described above. More combinations of ACKs/NACKs may be supported by a pair of ACK resources by removing the orthogonal spreading.

In yet another design, channel selection may be used with reduced orthogonal spreading. Up to four modulation symbols may be sent on a pair of ACK resources by spreading with an orthogonal sequence of length two, as described above. More combinations of ACKs/NACKs may be supported by a pair of ACK resources by reducing the orthogonal spreading.

In one design, channel selection may be used without bundling, as described above. In this case, the UE may generate one ACK/NACK for each transport block received on the downlink. In another design, channel selection may be used with bundling, which may be performed in various manners. In one design of bundling, the UE may bundle ACKs/NACKs for all transport blocks sent with MIMO on each downlink carrier and may obtain one bundled ACK/NACK for each downlink carrier. In another design, the UE may bundle ACKs/NACKs for all transport blocks sent on all downlink carriers for each layer and may obtain one bundled ACK/NACK for each layer. The bundled ACKs/NACKs for all downlink carriers or layers may then be sent with channel selection in similar manner as regular ACKs/NACKs.

As shown in FIG. 3, a UE may send ACK information in two slots of a subframe. The UE may encode and send the ACK information in various manners. In one design, the UE may send the ACK information with repetition across the two slots of a subframe. The UE may generate C code bits for the ACK information, where C≧1, send the C code bits on one resource block in the left slot, and send the same C code bits on another resource block in the right slot. The UE may thus send the same C code bits with repetition in the two slots of a subframe. In another design, the UE may send the ACK information with joint coding across the two slots of a subframe. The UE may generate 2C code bits for the ACK information, send the first C code bits on one resource block in the left slot, and send the remaining C code bits on another resource block in the right slot. The UE may send the ACK information with either repetition or joint coding for each of the designs described above. The UE may also send the ACK information in other manners.

Figure 7:
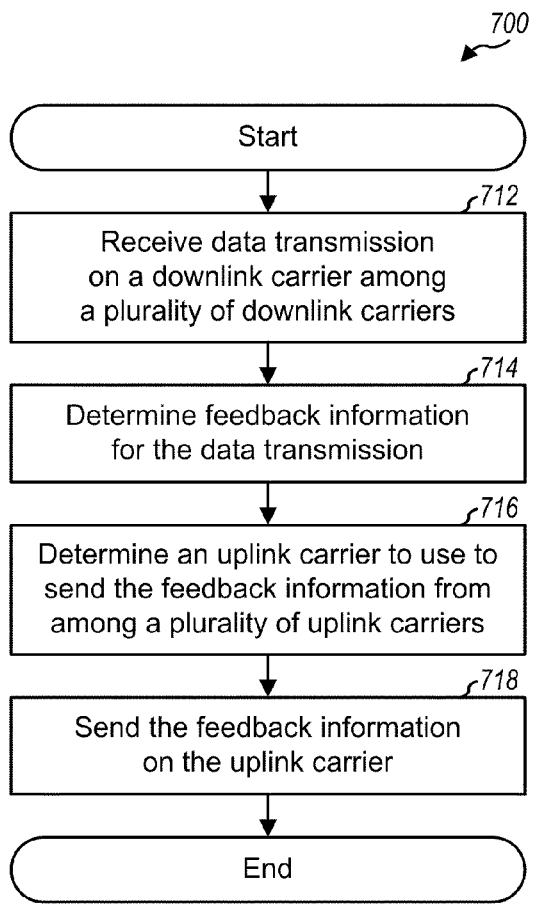
FIG. 7 shows a process for sending feedback information.

FIG. 7 shows a design of a process 700 for sending feedback information in a wireless communication system. Process 700 may be performed by a UE (as described below) or by some other entity. The UE may receive data transmission on a downlink carrier among a plurality of downlink carriers (block 712). The UE may determine feedback information for the data transmission (block 714). The feedback information may comprise ACK information (e.g., ACK and/or NACK), or CQI information, or some other information, or a combination thereof. The UE may determine an uplink carrier to use to send the feedback information from among a plurality of uplink carriers (block 716). The UE may then send the feedback information on the uplink carrier (block 718).

The UE may determine the uplink carrier to use to send the feedback information in various manners. In one design, the UE may receive a flag indicative of whether to use a designated uplink carrier or a paired uplink carrier to send the feedback information. The paired uplink carrier may be associated with (i) the downlink carrier used for the data transmission, or (ii) a downlink carrier used to send a downlink grant, or (iii) and some other downlink carrier. The UE may determine the uplink carrier to use to send the feedback information based on the flag. The UE may send the feedback information on the designated uplink carrier if the flag is set to a first value and on the paired uplink carrier if the flag is set to a second value.

In another design, the UE may receive signaling identifying the uplink carrier to use to send the feedback information. The signaling may be sent specifically to the UE via upper layer (e.g., RRC) signaling or may be broadcast to all UEs.

In yet another design, the UE may receive a downlink grant on a second downlink carrier among the plurality of downlink carriers. The downlink grant may be for the data transmission on the downlink carrier. The uplink carrier to use to send the feedback information may be the uplink carrier paired with the second downlink carrier used to send the downlink grant, which may or may not be the downlink carrier used for data transmission.

In one design, for many-to-one mapping, feedback for data transmissions on the plurality of downlink carriers may be sent on the same uplink carrier. The UE may receive a second data transmission on another downlink carrier among the plurality of downlink carriers. The UE may send feedback information for the second data transmission on the same uplink carrier.

Figure 8:
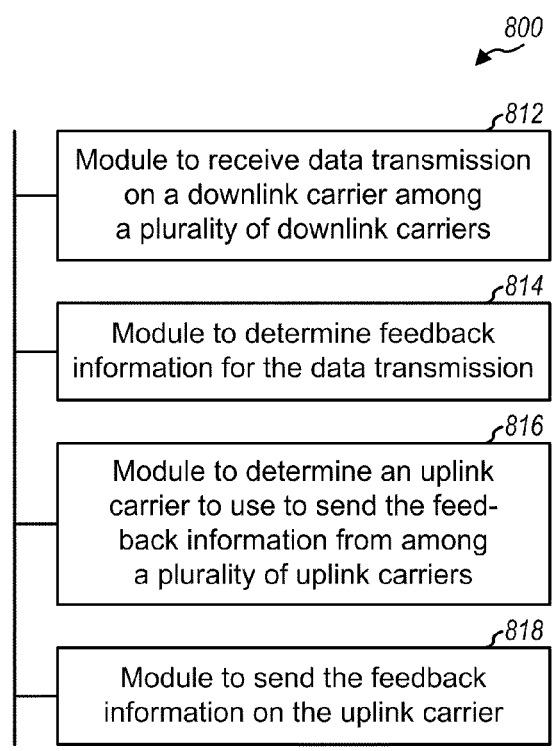
FIG. 8 shows an apparatus for sending feedback information.

FIG. 8 shows a design of an apparatus 800 for sending feedback information in a wireless communication system. Apparatus 800 includes a module 812 to receive data transmission on a downlink carrier among a plurality of downlink carriers, a module 814 to determine feedback information for the data transmission, a module 816 to determine an uplink carrier to use to send the feedback information from among a plurality of uplink carriers, and a module 818 to send the feedback information on the uplink carrier.

Figures 9, 10:
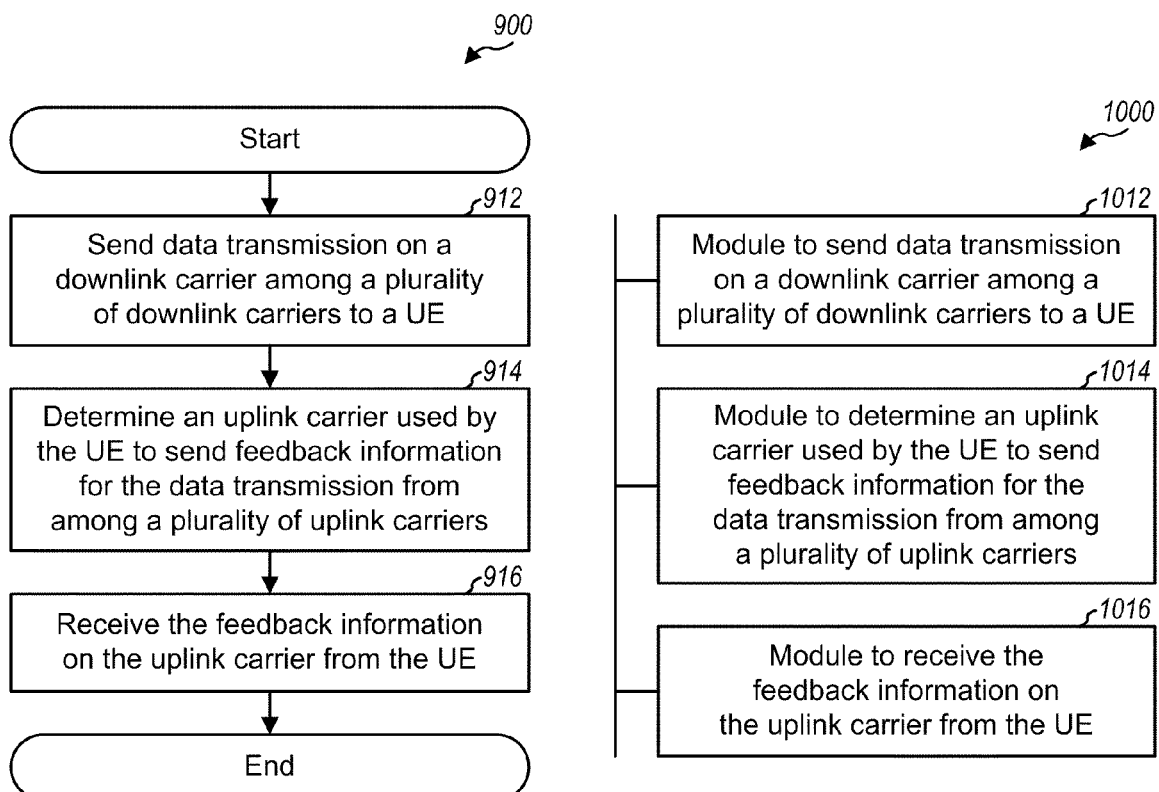
FIG. 9 shows a process for receiving feedback information.
FIG. 10 shows an apparatus for receiving feedback information.

FIG. 9 shows a design of a process 900 for receiving feedback information in a wireless communication system. Process 900 may be performed by a base station/eNB (as described below) or by some other entity. The base station may send data transmission on a downlink carrier among a plurality of downlink carriers to a UE (block 912). The base station may determine an uplink carrier used by the UE to send feedback information (e.g., ACK information, CQI information, etc.) for the data transmission from among a plurality of uplink carriers (block 914). The base station may receive the feedback information on the uplink carrier from the UE (block 916).

In one design, the base station may send a flag indicative of whether to use a designated uplink carrier or a paired uplink carrier to send the feedback information. The uplink carrier used to send the feedback information may be determined based on the flag. In another design, the base station may send signaling identifying the uplink carrier used to send the feedback information. In yet another design, the base station may send a downlink grant on a second downlink carrier among the plurality of downlink carriers. The uplink carrier used to send the feedback information may be paired with the second downlink carrier used to send the downlink grant. The second downlink carrier may or may not be the downlink carrier used for data transmission.

In one design, the base station may send a second data transmission on another downlink carrier among the plurality of downlink carriers to the UE. The base station may receive feedback information for the second data transmission on the same uplink carrier from the UE.

FIG. 10 shows a design of an apparatus 1000 for receiving feedback information in a wireless communication system. Apparatus 1000 includes a module 1012 to send data transmission on a downlink carrier among a plurality of downlink carriers to a UE, a module 1014 to determine an uplink carrier used by the UE to send feedback information for the data transmission from among a plurality of uplink carriers, and a module 1016 to receive the feedback information on the uplink carrier from the UE.

FIG. 11 shows a design of a process 1100 for sending feedback information in a wireless communication system. Process 1100 may be performed by a UE (as described below) or by some other entity. The UE may receive data transmissions on a plurality of downlink carriers (block 1112) and may determine feedback information for the data transmissions (block 1114). The feedback information may comprise ACK information, or CQI information, or some other information, or a combination thereof. The UE may send the feedback information on at least one uplink carrier using SC-FDMA (block 1116).

In one design, the UE may send the feedback information in a plurality of frequency regions of the at least one uplink carrier, one frequency region for each downlink carrier. The UE may receive signaling identifying at least one frequency offset for the plurality of frequency regions. In another design, the UE may send the feedback information in a single frequency region of a single uplink carrier. In yet another design, the UE may send the feedback information on a plurality of resources for the at least one uplink carrier. The plurality of resources may correspond to different frequency regions, or different orthogonal sequences, or different reference signal sequences, or some other type of resources, or a combination thereof. The UE may receive signaling identifying the plurality of resources to use to send the feedback information. The signaling may be dedicated signaling (e.g., RRC signaling) sent specifically to the UE or broadcast signaling (e.g., system information) sent to all UEs.

In one design, the UE may send the feedback information with repetition coding. In this design, the UE may generate a plurality of code bits based on the feedback information. The UE may then send the plurality of code bits in a first slot of a subframe and also in a second slot of the subframe. In another design, the UE may send the feedback information with joint coding. In this design, the UE may generate a plurality of code bits based on the feedback information. The UE may send a first subset (e.g., the first half) of the plurality of code bits in a first slot of a subframe and may send a second subset (e.g., the second half) of the plurality of code bits in a second slot of the subframe.

In one design, the UE may send the feedback information for the data transmissions on the plurality of downlink carriers without bundling. In this design, the UE may send an ACK or a NACK for the data transmission on each downlink carrier (or for each transport block sent on each downlink carrier). In another design, the UE may send the feedback information for the data transmissions on the plurality of downlink carriers with bundling. In this design, the UE may determine an ACK or a NACK for the data transmission on each downlink carrier. The UE may then determine a bundled ACK or NACK for the data transmissions on the plurality of downlink carriers based on the ACK or NACK for the data transmission on each downlink carrier. The UE may send the bundled ACK or NACK in similar manner as an ACK or NACK for data transmission on a single downlink carrier.

FIG. 12 shows a design of an apparatus 1200 for sending feedback information in a wireless communication system. Apparatus 1200 includes a module 1212 to receive data transmissions on a plurality of downlink carriers, a module 1214 to determine feedback information for the data transmissions, and a module 1216 to send the feedback information on at least one uplink carrier using SC-FDMA.

FIG. 13 shows a design of a process 1300 for receiving feedback information in a wireless communication system.

Process 1300 may be performed by a base station/eNB (as described below) or by some other entity. The base station may send data transmissions on a plurality of downlink carriers to a UE (block 1312). The base station may receive feedback information for the data transmissions on the plurality of downlink carriers from the UE (block 1314). The feedback information may be sent by the UE on at least one uplink carrier using SC-FDMA and may comprise ACK information, or CQI information, or some other information, or a combination thereof.

In one design, the base station may receive the feedback information from a plurality of frequency regions of the at least one uplink carrier, one frequency region for each downlink carrier. The base station may send signaling identifying at least one frequency offset for the plurality of frequency regions. In another design, the base station may receive the feedback information from a single frequency region of a single uplink carrier. In yet another design, the base station may receive the feedback information on a plurality of resources for the at least one uplink carrier. The plurality of resources may correspond to different frequency regions, or different orthogonal sequences, or different reference signal sequences, or a combination thereof. The base station may send signaling identifying the plurality of resources. The signaling may be dedicated signaling sent specifically to the UE or broadcast signaling sent to all UEs.

In one design, the base station may perform decoding for the feedback information sent with repetition coding in two slots of a subframe. In another design, the base station may perform joint decoding for the feedback information sent with joint coding across two slots of a subframe.

In one design, the base station may receive ACK information sent without bundling. In this design, the base station may receive an ACK or a NACK for the data transmission on each downlink carrier (or for each transport block). In another design, the base station may receive ACK information sent with bundling. In this design, the base station may obtain a bundled ACK or NACK for the data transmissions on the plurality of downlink carriers. The bundled ACK or NACK may be determined by the UE based on an ACK or a NACK obtained for data transmission on each downlink carrier. The base station may resend all data transmissions on the plurality of downlink carriers if a bundle NACK is obtained and may terminate all data transmissions if a bundle ACK is obtained.

FIG. 14 shows a design of an apparatus 1400 for receiving feedback information in a wireless communication system. Apparatus 1400 includes a module 1412 to send data transmissions on a plurality of downlink carriers to a UE, and a module 1414 to receive feedback information for the data transmissions on the plurality of downlink carriers from the UE, the feedback information being sent by the UE on at least one uplink carrier using SC-FDMA.

The modules in FIGS. 8, 10, 12 and 14 may comprise processors, electronic devices, hardware devices, electronic components, logical circuits, memories, software codes, firmware codes, etc., or any combination thereof.

Figure 15:
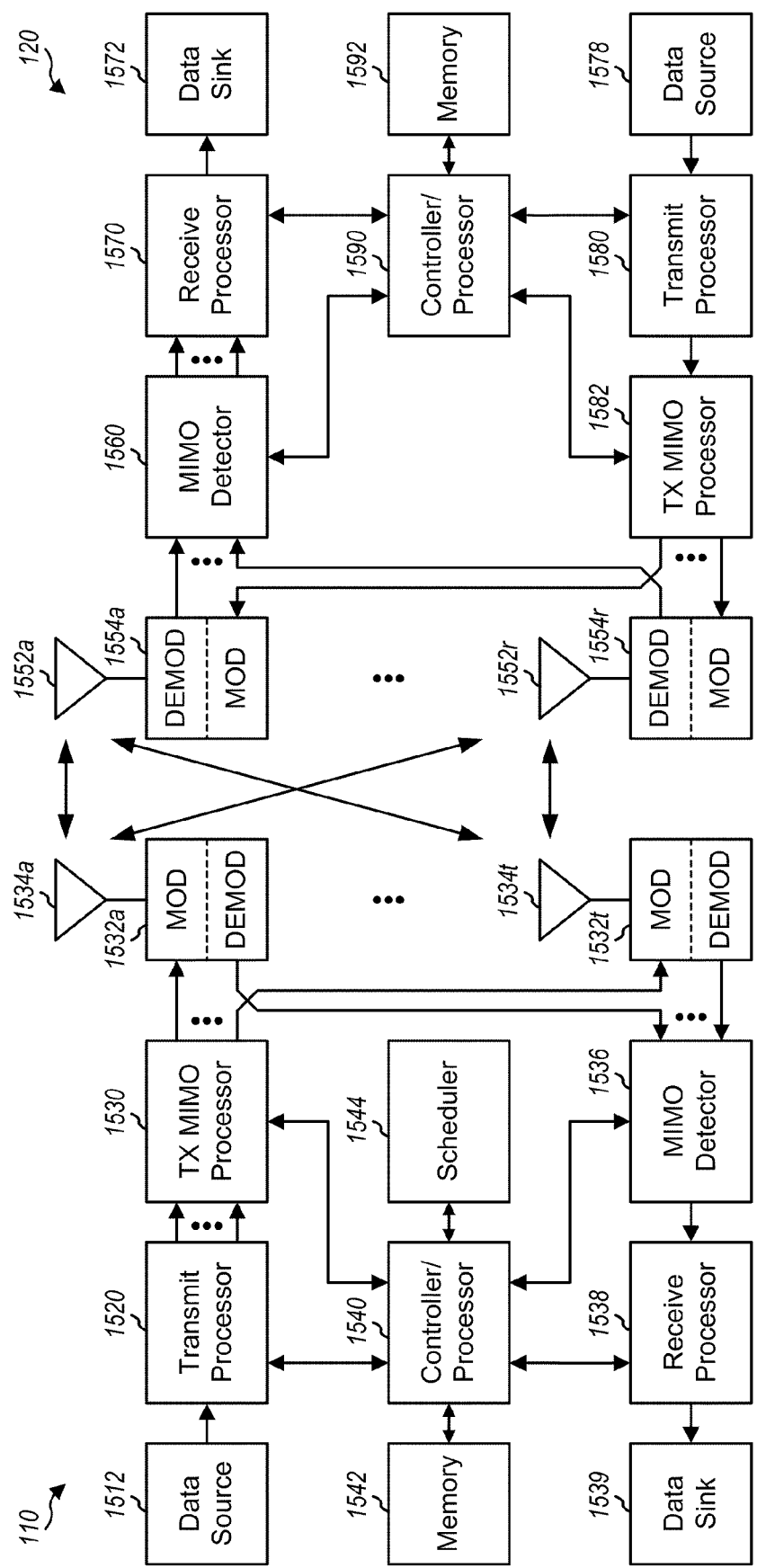
FIG. 15 shows a block diagram of a base station and a UE.

FIG. 15 shows a block diagram of a design of a base station/eNB 110 and a UE 120, which may be one of the base stations/eNBs and one of the UEs in FIG. 1. Base station 110 may be equipped with T antennas 1534a through 1534t, and UE 120 may be equipped with R antennas 1552a through 1552r, where in general T≥1 and R≥1.

At base station 110, a transmit processor 1520 may receive data from a data source 1512 for one or more UEs, process (e.g., encode and modulate) the data for each UE based on one or more modulation and coding schemes selected for that UE, and provide data symbols for all UE. Transmit processor 1520 may also process control information (e.g., downlink grants, RRC signaling, etc.) and provide control symbols. A TX MIMO processor 1530 may precode the data symbols, the control symbols, and/or reference symbols (if applicable) and may provide T output symbol streams to T modulators (MOD) 1532a through 1532t. Each modulator 1532 may process its output symbol stream (e.g., for OFDM) to obtain an output sample stream. Each modulator 1532 may further condition (e.g., convert to analog, filter, amplify, and upconvert) its output sample stream and generate a downlink signal. T downlink signals from modulators 1532a through 1532t may be transmitted via T antennas 1534a through 1534t, respectively.

At UE 120, R antennas 1552a through 1552r may receive the T downlink signals from eNB 110, and each antenna 1552 may provide a received signal to an associated demodulator (DEMOD) 1554. Each demodulator 1554 may condition (e.g., filter, amplify, downconvert, and digitize) its received signal to obtain samples and may further process the samples (e.g., for OFDM) to obtain received symbols. A MIMO detector 1560 may obtain received symbols from all demodulators 1554, perform MIMO detection on the received symbols if applicable, and provide detected symbols. A receive processor 1570 may process (e.g., demodulate and decode) the detected symbols, provide decoded data for UE 120 to a data sink 1572, and provide decoded control information to a controller/processor 1590.

On the uplink, at UE 120, data from a data source 1578 and control information (e.g., feedback information such as ACK information, CQI information, etc.) from controller/processor 1590 may be processed by a transmit processor 1580, precoded by a TX MIMO processor 1582 if applicable, further processed by modulators 1554a through 1554r, and transmitted to base station 110. At base station 110, the uplink signals from UE 120 may be received by antennas 1534, processed by demodulators 1532, detected by a MIMO detector 1536 if applicable, and further processed by a receive processor 1538 to recover the data and control information sent by UE 120. The recovered data may be provided to a data sink 1539, and the recovered control information may be provided to controller/processor 1540.

Controllers/processors 1540 and 1590 may direct the operation at base station 110 and UE 120, respectively. Processor 1590 and/or other processors and modules at UE 120 may perform or direct process 700 in FIG. 7, process 1100 in FIG. 11, and/or other processes for the techniques described herein. Processor 1540 and/or other processors and modules at base station 110 may perform or direct process 900 in FIG. 9, process 1300 in FIG. 13, and/or other processes for the techniques described herein. Memories 1542 and 1592 may store data and program codes for base station 110 and UE 120, respectively. A scheduler 1544 may schedule UE 120 and/or other UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving Radio Resource Control (RRC) signaling identifying a designated uplink carrier;
   receiving a data transmission on a first downlink carrier among a plurality of downlink carriers;
   determining feedback information for the data transmission;
   receiving a flag indicative of whether to use the designated uplink carrier or a paired uplink carrier to send the feedback information, wherein the paired uplink carrier is associated with the first downlink carrier used for the data transmission or another downlink carrier used to send a downlink grant;
   determining to use the designated uplink carrier or the paired uplink carrier to send the feedback information from among a plurality of uplink carriers based on the received flag; and
   sending the feedback information on the determined uplink carrier.

2. The method of claim 1, wherein the feedback information comprises acknowledgement (ACK) information, or channel quality indicator (CQI) information, or both.

3. The method of claim 1, further comprising:
   receiving a downlink grant on a second downlink carrier among the plurality of downlink carriers, wherein the downlink grant is for a data transmission on the second downlink carrier, and wherein the determined uplink carrier to use to send the feedback information is paired with the second downlink carrier used to send the downlink grant.

4. The method of claim 1, wherein the determined uplink carrier is used to send feedback information for the plurality of downlink carriers.

5. The method of claim 1, further comprising:
   receiving a second data transmission on a second downlink carrier among the plurality of downlink carriers; and
   sending feedback information for the second data transmission on the determined uplink carrier.

6. An apparatus for wireless communication, comprising:
   means for receiving Radio Resource Control (RRC) signaling indentifying a designated uplink carrier;
   means for receiving a data transmission on a first downlink carrier among a plurality of downlink carriers;
   means for determining feedback information for the data transmission;
   means for receiving a flag indicative of whether to use the designated uplink carrier or a paired uplink carrier to send the feedback information, wherein the paired uplink carrier is associated with the first downlink carrier used for the data transmission or another downlink carrier used to send a downlink grant;

means for determining to use the designated uplink carrier or the paired uplink carrier to send the feedback information from among a plurality of uplink carriers based on the received flag; and means for sending the feedback information on the determined uplink carrier.

7. The apparatus of claim 6, further comprising:

means for receiving a downlink grant on a second downlink carrier among the plurality of downlink carriers, wherein the downlink grant is for a data transmission on the second downlink carrier, and wherein the determined uplink carrier to use to send the feedback information is paired with the second downlink carrier used to send the downlink grant.

8. An apparatus for wireless communication, comprising:

at least one processor configured to receive Radio Resource Control (RRC) signaling identifying a designated uplink carrier, receive a data transmission on a first downlink carrier among a plurality of downlink carriers, to determine feedback information for the data transmission, to receive a flag indicative of whether to use the designated uplink carrier or a paired uplink carrier to send the feedback information, wherein the paired uplink carrier is associated with the first downlink carrier used for the data transmission or another downlink carrier used to send a downlink grant, to determine to use the designated uplink carrier or the paired uplink carrier to send the feedback information from among a plurality of uplink carriers based on the received flag, and to send the feedback information on the determined uplink carrier.

9. The apparatus of claim 8, wherein the at least one processor is configured to receive a downlink grant on a second downlink carrier among the plurality of downlink carriers, wherein the downlink grant is for a data transmission on the second downlink carrier, and wherein the determined uplink carrier to use to send the feedback information is paired with the second downlink carrier used to send the downlink grant.

10. A computer program product, comprising:

a computer-readable medium comprising:

code for causing at least one computer to receive Radio Resource Control (RRC) signaling indentifying a designated uplink carrier;

code for causing at least one computer to receive a data transmission on a first downlink carrier among a plurality of downlink carriers, code for causing the at least one computer to determine feedback information for the data transmission, code for causing the at least one computer to receive a flag indicative of whether to use the designated uplink carrier or a paired uplink carrier to send the feedback information, wherein the paired uplink carrier is associated with the first downlink carrier used for the data transmission or another downlink carrier used to send a downlink grant;

code for causing the at least one computer to determine to use the designated uplink carrier or the paired uplink carrier to send the feedback information from among a plurality of uplink carriers based on the received flag, and code for causing the at least one computer to send the feedback information on the determined uplink carrier.

11. A method for wireless communication, comprising:

sending Radio Resource Control (RRC) signaling identifying a designated uplink carrier;

sending a data transmission on a first downlink carrier among a plurality of downlink carriers to a user equipment (UE);

sending a flag indicative of whether to use the designated uplink carrier or a paired uplink carrier to send the feedback information, wherein the paired uplink carrier is associated with the first downlink carrier used for the data transmission or another downlink carrier used to send a downlink grant, determining the designated uplink carrier or the paired uplink carrier used by the UE to send feedback information for the data transmission from among a plurality of uplink carriers based on the flag; and receiving the feedback information on the determined uplink carrier from the UE.

12. The method of claim 11, further comprising:

sending a downlink grant on a second downlink carrier among the plurality of downlink carriers, wherein the downlink grant is for a data transmission on the second downlink carrier, and wherein the determined uplink carrier used to send the feedback information is paired with the second downlink carrier used to send the downlink grant.

13. The method of claim 11, further comprising:

sending a second data transmission on a second downlink carrier among the plurality of downlink carriers to the UE; and receiving feedback information for the second data transmission on the determined uplink carrier from the UE.

14. An apparatus for wireless communication, comprising:

means for sending Radio Resource Control (RRC) signaling identifying a designated uplink carrier;

means for sending a data transmission on a first downlink carrier among a plurality of downlink carriers to a user equipment (UE);

means for sending a flag indicative of whether to use the designated uplink carrier or a paired uplink carrier to send the feedback information, wherein the paired uplink carrier is associated with the first downlink carrier used for the data transmission or another downlink carrier used to send a downlink grant;

means for determining the designated uplink carrier or the paired uplink carrier used by the UE to send feedback information for the data transmission from among a plurality of uplink carriers based on the flag; and means for receiving the feedback information on the determined uplink carrier from the UE.

15. The apparatus of claim 14, further comprising:

means for sending a downlink grant on a second downlink carrier among the plurality of downlink carriers, wherein the downlink grant is for a data transmission on the second downlink carrier, and wherein the determined uplink carrier used to send the feedback information is paired with the second downlink carrier used to send the downlink grant.

* * * * *